(12) United States Patent
Kinpara et al.

(10) Patent No.: US 7,800,337 B2
(45) Date of Patent: Sep. 21, 2010

(54) CONTROL APPARATUS FOR AC ROTARY MACHINE AND METHOD FOR MEASURING ELECTRICAL CONSTANT OF AC ROTARY MACHINE USING THE CONTROL APPARATUS

(75) Inventors: Yoshihiko Kinpara, Tokyo (JP); Takahiko Kobayashi, Tokyo (JP); Keita Hatanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 419 days.

(21) Appl. No.: 11/851,797

(22) Filed: Sep. 7, 2007

(65) Prior Publication Data

US 2008/0180054 A1 Jul. 31, 2008

(30) Foreign Application Priority Data

Jan. 29, 2007 (JP) ............................. 2007-017800

(51) Int. Cl.
*H02P 1/46* (2006.01)

(52) U.S. Cl. .................. 318/712; 318/798; 318/722

(58) Field of Classification Search ................ 318/712, 318/798, 727, 439, 400.32, 375, 611, 376, 318/629, 632, 801, 805, 806, 807, 811
See application file for complete search history.

(56) References Cited

U.S. PATENT DOCUMENTS

2005/0248306 A1* 11/2005 Chen et al. .................. 318/712

FOREIGN PATENT DOCUMENTS

| JP | 5-103471 | 4/1993 |
|---|---|---|
| JP | 8-187000 | 7/1996 |
| JP | 3019653 | 1/2000 |
| JP | 2001-251889 | 9/2001 |
| JP | 2002-171797 | 6/2002 |
| JP | 3468459 | 9/2003 |
| JP | 2004-297966 | 10/2004 |
| WO | WO 2004/109310 A1 | 12/2004 |
| WO | WO 2006/008846 A1 | 1/2006 |

* cited by examiner

*Primary Examiner*—Karen Masih
(74) *Attorney, Agent, or Firm*—Oblon, Spivak, McClelland, Maier & Neustadt, L.L.P.

(57) ABSTRACT

A control apparatus for an AC rotary machine, including first voltage command calculation means for calculating first voltage commands from current commands, an angular frequency, and constant set values of the AC rotary machine, second voltage command calculation means for calculating second voltage commands on the basis of difference currents between the current commands and current detection values, so that the difference currents may converge into zero, third voltage command calculation means for calculating third voltage commands by adding the first voltage commands and the second voltage commands, voltage application means for applying voltages to the AC rotary machine on the basis of the third voltage commands, and constant measurement means for calculating the constant set values on the basis of the second voltage commands.

20 Claims, 19 Drawing Sheets

CONTROL APPARATUS FOR AC ROTARY MACHINE AND METHOD FOR MEASURING ELECTRICAL CONSTANT OF AC ROTARY MACHINE USING THE CONTROL APPARATUS

BACKGROUND OF THE INVENTION

1. Field of the Invention

This invention relates to a control apparatus which can measure the electrical constant of an AC rotary machine such as induction machine or synchronous machine, and a method for measuring the electrical constant.

2. Description of the Background Art

Heretofore, there has been introduced a method which uses a control apparatus for an AC rotary machine and which measures, for example, an armature inductance or a magnetic flux vector as the electrical constant of the AC rotary machine.

By way of example, a control apparatus in Patent Document 1 (Japanese Patent No. 3,019,653) first executes constant-V/f control processing and outputs a primary voltage command V1c in proportion to a primary angular frequency command $\omega 1$. Besides, the control apparatus integrates the primary angular frequency command $\omega 1$ so as to evaluate the phase command $\theta v1$ of a primary voltage vector. In addition, the control apparatus outputs a PWM signal in correspondence with the magnitude command V1c of a primary voltage and the phase command $\theta v1$ of the primary voltage vector, thereby to perform a steady running with a rated magnetic flux (the ratio between a rated frequency and a rated voltage) near the rated frequency. Subsequently, the control apparatus executes predetermined calculations by general three-phase AC/two-phase DC conversion processing, thereby to evaluate a reactive power component current Id and an active power component current Iq. In addition, the control apparatus evaluates a self-inductance, namely, the armature inductance L1 by a predetermined calculation on the basis of the currents Id and Iq, the primary angular frequency command $\omega 1$ and the primary voltage command value V1c, and a primary resistance r1 and a resultant leakage inductance Lx (Lx≈11+12) which have been measured beforehand.

Besides, Patent Document 2 (JP-A-2002-171797) discloses a system including a power converter which feeds power to a synchronous motor of permanent magnet type, and a control apparatus which controls the output voltage of the power converter with the magnitude of the magnetic flux vector of the permanent magnet of the synchronous motor. In addition, the control apparatus includes magnetic flux measurement means configured of a magnetic flux measuring current controller which has an acceleration mode wherein the synchronous motor is rotated to a predetermined revolution number by causing an AC current of predetermined magnitude to flow through the synchronous motor, and a measurement mode wherein the primary current of the synchronous motor is set at zero or a minute value, a magnetic flux measuring magnetic flux vector calculator which calculates a magnetic flux vector by temporally integrating the primary voltage vector of the synchronous motor detected or estimated, when the magnetic flux measuring current controller is in the measurement mode, a magnetic flux calculator which evaluates the magnitude of the magnetic flux vector from the output of the magnetic flux measuring magnetic flux vector calculator, and a magnetic flux memory which stores the output of the magnetic flux calculator therein. Further, the control apparatus operates the magnetic flux measurement means in a case where the magnitude of the magnetic flux vector stored in the magnetic flux memory needs to be updated.

In the prior-art control apparatus for the AC rotary machine as is disclosed in Patent Document 1, an inverter is driven on the basis of the primary angular frequency command value $\omega 1$ and the primary voltage command value V1c, so as to run the AC motor in a steady state, and the component Iq in the same direction as the inverter primary voltage vector direction of a motor current vector I1 and the component Id in the same direction as a direction lagging 90° from the same direction as the inverter primary voltage vector direction are calculated from the phase with the primary angular frequency command integrated and the current detection value of the AC motor on this occasion. In addition, the control apparatus calculates the primary self-inductance L1 or mutual inductance M of the AC motor by employing only the four fundamental arithmetic operations of a voltage, the currents and an angular frequency on the basis of the primary angular frequency command value $\omega 1$ and the primary voltage command value V1c or a primary voltage detection value V1, and the currents Iq and Id. Therefore, the control apparatus has the problem that noise which exists in the voltage detection value or the current detection value is directly reflected upon a calculated value. Another problem is that the measured constant is also influenced by the noise. Still another problem is that, since the measurement of the armature inductance is performed by the predetermined calculation based on the primary resistance r1 and the resultant leakage inductance Lx (Lx≈11+12) measured beforehand, the measurement precision of the armature inductance degrades unless the precisions of the primary resistance r1 and the resultant leakage inductance Lx measured beforehand are good.

On the other hand, the control apparatus for the AC rotary machine as is disclosed in Patent Document 2 employs the magnetic flux measuring magnetic flux vector calculator which calculates the magnetic flux vector by temporally integrating the detected or estimated primary voltage vector of the synchronous motor. In case of measuring the magnitude of the magnetic flux vector of the permanent magnet, accordingly, the control apparatus evaluates the magnitude of the magnetic flux vector of the permanent magnet from the length of a radius, with respect to that output of the magnetic flux measuring magnetic flux vector calculator which indicates the magnetic flux vector depicting a circular locus. Therefore, the control apparatus has the problems that the amplitude of a magnetic flux cannot be measured as a DC quantity, and that the evaluation of the length of the radius of the magnetic flux vector cannot be realized by an inexpensive arithmetic unit because it requires a microcomputer or the like arithmetic unit capable of sufficiently fast sampling.

SUMMARY OF THE INVENTION

This invention has been made in order to solve the problems as stated above, and it has for its object to provide a control apparatus for an AC rotary machine as can measure the electrical constant of the AC rotary machine with ease and at a high precision while a current control is being performed, and a method for measuring the electrical constant of an AC rotary machine which uses the control apparatus.

A control apparatus for an AC rotary machine according to this invention consists in a control apparatus for an AC rotary machine, wherein the AC rotary machine is driven on the basis of current commands on rotating two-axis coordinates (hereinbelow, termed "d-q axes") which rotate at an angular frequency of the AC rotary machine. The control apparatus includes current detection means for detecting currents of the AC rotary machine; coordinate transformation means for transforming current detection values from the current detection means, into current detection values on the d-q axes; first voltage command calculation means for calculating first voltage commands on the d-q axes, from relational formulas among the current commands on the d-q axes, the angular frequency and a plurality of electrical constants of the AC rotary machine; second voltage command calculation means for calculating the second voltage commands on the d-q axes, on the basis of difference currents between the current commands on the d-q axes and the current detection values on the d-q axes, so that the difference currents may converge into zero; third voltage command calculation means for calculating third voltage commands on the d-q axes, by adding the first voltage commands on the d-q axes and the second voltage commands on the d-q axes; and voltage application means for applying voltages to the AC rotary machine on the basis of the third voltage commands on the d-q axes; wherein the first voltage command calculation means sets at least one of the plurality of electrical constants with a constant set value inputted from outside. The control apparatus further includes constant measurement means for calculating the constant set value on the basis of the second voltage commands from the second voltage command calculation means.

A method for measuring an electrical constant of an AC rotary machine according to this invention uses a control apparatus for an AC rotary machine, wherein the AC rotary machine is driven on the basis of current commands on rotating two-axis coordinates (hereinbelow, termed "d-q axes") which rotate at an angular frequency of the AC rotary machine, including current detection means for detecting currents of the AC rotary machine; coordinate transformation means for transforming current detection values from the current detection means, into current detection values on the d-q axes; first voltage command calculation means for calculating first voltage commands on the d-q axes, from relational formulas among the current commands on the d-q axes, the angular frequency and a plurality of electrical constants of the AC rotary machine; second voltage command calculation means for calculating the second voltage commands on the d-q axes, on the basis of difference currents between the current commands on the d-q axes and the current detection values on the d-q axes, so that the difference currents may converge into zero; third voltage command calculation means for calculating third voltage commands on the d-q axes, by adding the first voltage commands on the d-q axes and the second voltage commands on the d-q axes; and voltage application means for applying voltages to the AC rotary machine on the basis of the third voltage commands on the d-q axes; wherein the first voltage command calculation means sets at least one of the plurality of electrical constants with a constant set value inputted from outside; and further including constant measurement means for calculating the constant set value on the basis of the second voltage commands from the second voltage command calculation means. The measurement method comprises the steps of activating the control apparatus by setting the current commands and the angular frequency at predetermined values or ranges, and outputting the constant set value from the constant measurement means at a point of time at which the second voltage commands have entered a predetermined range, as the electrical constant of the AC rotary machine to-be-measured.

As described above, the control apparatus for the AC rotary machine according to this invention includes the constant measurement means for calculating the constant set value which is set as the electrical constant of the AC rotary machine by the first voltage command calculation means, on the basis of the second voltage commands from the second voltage command calculation means. Therefore, the control precision of the control apparatus for the AC rotary machine is enhanced, and the noises of voltage detection values and current detection values are prevented from being directly reflected, so that an accurate measurement value is obtained as the measured electrical constant without being influenced by the noises.

Besides, the method for measuring the electrical constant of the AC rotary machine according to this invention activates the control apparatus by setting the current commands and the angular frequency at the predetermined values or ranges, and it outputs the constant set value from the constant measurement means at the point of time at which the second voltage commands have entered the predetermined range, as the electrical constant of the AC rotary machine to-be-measured. Therefore, the electrical constant of the AC rotary machine can be easily measured, and the noises of voltage detection values and current detection values are prevented from being directly reflected, so that an accurate measurement value is obtained as the measured electrical constant without being influenced by the noises.

The foregoing and other objects, features, aspects and advantages of this invention will become more apparent from the following detailed description when read in conjunction with the accompanying drawings.

DETAILED DESCRIPTION OF THE PREFERRED EMBODIMENTS OF THE INVENTION

First Embodiment

Figure 1:
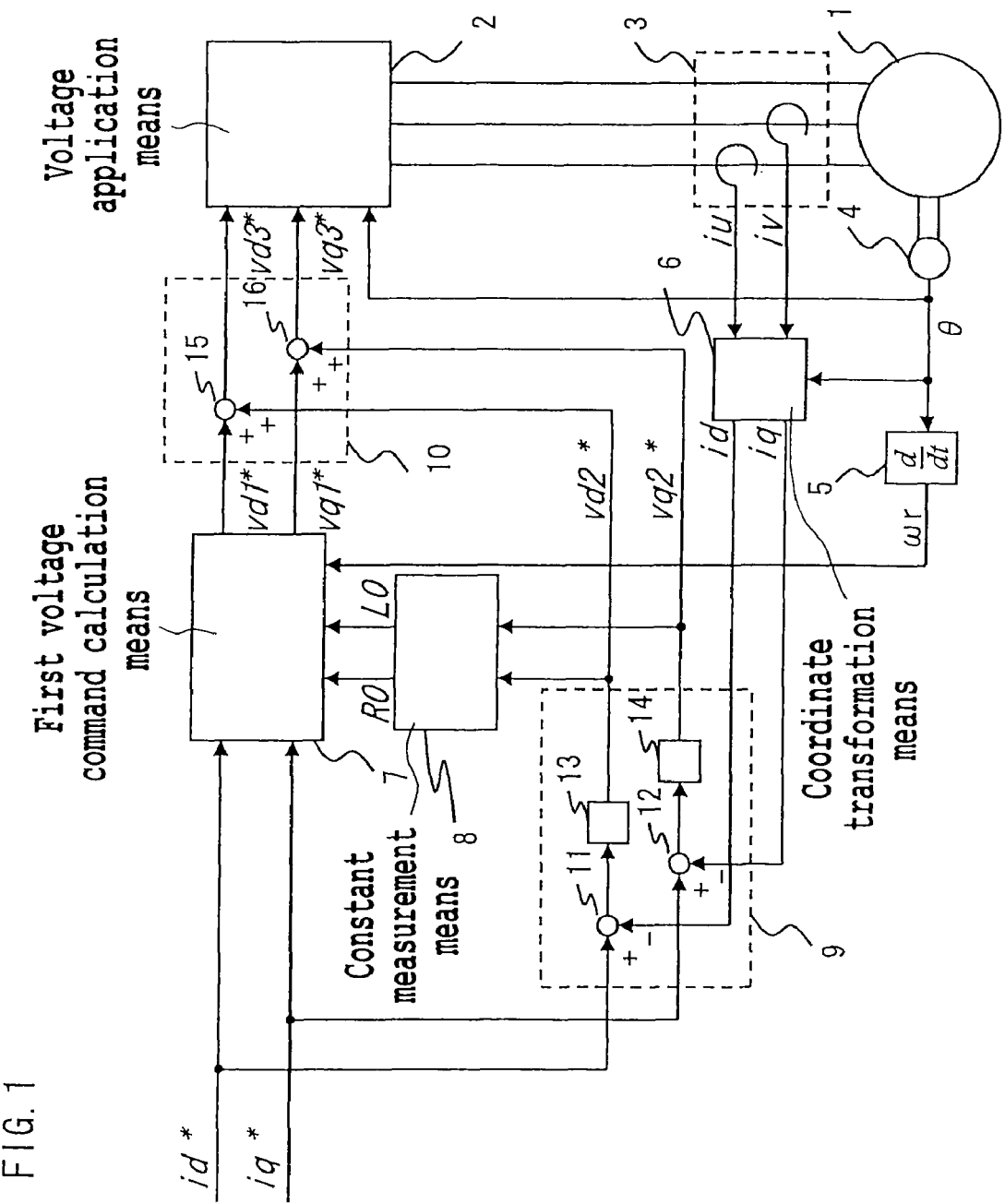
FIG. 1 is a block diagram showing the configuration of a control apparatus for an AC rotary machine according to a first embodiment of this invention.

FIG. 1 is a block diagram showing the configuration of a control apparatus for an AC rotary machine according to the first embodiment of this invention. The AC rotary machine 1 is a synchronous machine, which is a synchronous machine of surface magnet type here. Voltage application means 2 for applying voltages, to which a power converter such as inverter corresponds, current detection means 3 for detecting the currents of the AC rotary machine 1, and a rotational position detector 4 which detects a rotational position θ of the AC rotary machine 1, are connected to the AC rotary machine 1.

The voltage application means 2 applies the U-phase voltage vu, V-phase voltage vv and W-phase voltage vw of three-phase voltages to the AC rotary machine 1, and the current detection means 3 detects the currents of at least two phases among the three-phase currents of the AC rotary machine 1. The current detection means 3 in this embodiment detects a U-phase current iu and a V-phase current iv from power lines which couple the AC rotary machine 1 and the voltage application means 2.

Incidentally, apart from the method in which the U-phase current and the V-phase current are directly detected as shown in FIG. 1, the current detection means 3 may well employ a method in which a W-phase current is directly detected in addition to the U-phase current and the V-phase current. It is also allowed to employ a method being a known technique, in which the U-phase current and the V-phase current are detected from the DC link current of the voltage application means 2 (refer to, for example, Y. Murai et al., "Three-Phase Current-Waveform-Detection on PWM Inverter from DC Link Current-Steps", Proceedings of IPEC-Yokohama 1995, pp. 271-275, Yokohama, Japan, April 1995).

A differentiator 5 calculates the variation rate of the rotational position θ outputted from the rotational position detector 4, and outputs the calculated value as a rotational speed ωr of the AC rotary machine 1. Coordinate transformation means 6 coordinate-transforms the currents obtained from the current detection means 3, into currents on rotating two-axis coordinates (d-q axes) which rotate at the angular frequency ωr. More specifically, the coordinate transformation means 6 coordinate-transforms three-phase currents obtained from the U-phase current iu and the V-phase current iv outputted from the current detection means 3, onto the rotating two-axis coordinates (d-q axes) which rotate in synchronism with the rotational position θ that is also a phase rotating at an angular frequency ω (=ωr), thereby to output currents id and iq on the rotating two-axis coordinates (d-q axes).

First voltage command calculation means 7 outputs first voltage commands vd1* and vq1* on the rotating two-axis coordinates (d-q axes), on the basis of current commands id* and iq* on the rotating two-axis coordinates (d-q axes) and the angular frequency ωr, in conformity with Formulas (3) and (4) to be stated later. The first voltage command calculation means 7 obtains at least one of the electrical constants of the AC rotary machine 1, here, an armature resistance set value r0 and an armature inductance set value L0, from constant measurement means 8.

Second voltage command calculation means 9 calculates the difference currents between the current commands id* and iq* on the rotating two-axis coordinates (d-q axes) and the currents id and iq on the rotating two-axis coordinates (d-q axes), respectively, and it outputs second voltage commands vd2* and vq2* on the rotating two-axis coordinates (d-q axes), on the basis of the difference currents so that the difference currents may converge into zero.

The constant measurement means 8 supplies the first voltage command calculation means 7 with the armature resistance set value R0 and the armature inductance set value L0 of the AC rotary machine 1 calculated on the basis of the second voltage commands vd2* and vq2* outputted from the second voltage command calculation means 9.

Third voltage command calculation means 10 calculates the added voltages between the first voltage commands vd1* and vq1* and the second voltage commands vd2* and vq2*, respectively, and it outputs third voltage commands vd3* and vq3* on the rotating two-axis coordinates (d-q axes), on the basis of the added voltages.

The voltage application means 2 applies the voltages to the AC rotary machine 1 on the basis of the third voltage commands vd3* and vq3* outputted from the third voltage command calculation means 10.

The second voltage command calculation means 9 includes a subtracter 11 which calculates a difference current by subtracting the d-axial component id of the current on the rotating two-axis coordinates (d-q axes), from the d-axial component id* of the current command on the rotating two-axis coordinates (d-q axes), a subtracter 12 which calculates a difference current by subtracting the q-axial component iq of the current on the rotating two-axis coordinates (d-q axes), from the q-axial component iq* of the current command on the rotating two-axis coordinates (d-q axes), an amplifier 13 which amplifies the output of the subtracter 11 by a proportional integration, and an amplifier 14 which amplifies the output of the subtracter 12 by a proportional integration.

The third voltage command calculation means 10 includes an adder 15 which calculates an added voltage obtained by adding the d-axial component vd1* of the first voltage command and the d-axial component vd2* of the second voltage command, and an adder 16 which calculates an added voltage obtained by adding the q-axial component vq1* of the first voltage command and the q-axial component vq2* of the second voltage command, whereby the outputs of the adders 15 and 16 are respectively delivered as the third voltage commands vd3* and vq3*.

Next, the concrete calculational contents of the respective calculation means will be described. The AC rotary machine 1 in this embodiment is the surface magnet type synchronous machine, and in a case where the d-axis of the rotating orthogonal coordinates (d-q axes) coincides with the rotor magnetic flux of the AC rotary machine 1, the following formulas hold:

$$vd = R \times id - \omega r \times L \times iq \quad (1)$$

$$vq = R \times iq + \omega r \times (L \times id + \phi f) \quad (2)$$

where:

vd: d-axial component of the voltage of the AC rotary machine 1, vq: q-axial component of the voltage of the AC rotary machine 1, R: armature resistance of the AC rotary machine 1, L: armature inductance of the AC rotary machine 1, $\phi f$: amplitude of the rotor magnetic flux of the AC rotary machine 1.

On the other hand, the first voltage command calculation means 7 outputs the first voltage commands vd1* and vq1* on the rotating two-axis coordinates (d-q axes), in conformity with Formulas (3) and (4) which are based on the respective current commands id* and iq* on the rotating two-axis coordinates (d-q axes) and the angular frequency ωr:

$$vd1^* = R0 \times id^* - \omega r \times L0 \times iq^* \quad (3)$$

$$vq1^* = R0 \times iq^* + \omega r \times (L0 \times id^* + \phi f0) \quad (4)$$

where:

$\phi f0$: set value of the amplitude of the rotor magnetic flux of the AC rotary machine 1.

Here, description will be made assuming that the amplitude of the rotor magnetic flux of the AC rotary machine 1 is known. In a case where the assumption holds, $\phi f0 = \phi f$ holds. Incidentally, regarding a case where the amplitude of the rotor magnetic flux of the AC rotary machine 1 is unknown, description will be made in a fifth Embodiment later.

Operations to be stated below can be verified at the point of time at which, after the activation of the above control system, the operation thereof has fallen into a steady state, here, the voltages and currents have become substantially constant values, for example, the absolute values of the second voltage command calculation values vd2* and vq2* being the outputs of the second voltage command calculation means 9 have entered a predetermined range near zero.

More specifically, in the second voltage command calculation means 9, the d-axial component id* of the current command and the d-axial component id of the current are brought into agreement by the amplifier 13 which amplifies the output of the subtracter 11 by the proportional integration, and the q-axial component iq* of the current command and the q-axial component iq of the current are brought into agreement by the amplifier 14 which amplifies the output of the subtracter 12 by the proportional integration. Besides, the voltage application means 2 applies the voltages to the AC rotary machine 1 on the basis of the third voltage commands vd3* and vq3* outputted from the third voltage command calculation means 10, so that the d-axial component vd and q-axial component vq of the voltages of the AC rotary machine 1 agree with the third voltage commands vd3* and vq3*, respectively. Considering these relations, Formulas (5) to (10) hold:

$$vd3^* = vd2^* + R0 \times id^* - \omega r \times L0 \times iq^* \quad (5)$$

$$vq3^* = vq2^* + R0 \times iq^* + \omega r \times (L0 \times id^* + \phi f0) \quad (6)$$

$$id = id^* \quad (7)$$

$$iq = iq^* \quad (8)$$

$$vd = vd3^* \quad (9)$$

$$vq = vq3^* \quad (10)$$

When the relations of Formulas (1) to (10) are rearranged, Formulas (11) and (12) are obtained:

$$vd2^* = -(R0-R) \times id^* + \omega r \times (L0-L) \times iq^* \quad (11)$$

$$vq2^* = -(R0-R) \times iq^* - \omega r \times (L0-L) \times id^* \quad (12)$$

According to Formulas (11) and (12), in a case where neither of a resistance error (R0−R) and an inductance error (L0−L) exists, the second voltage command calculation values vd2* and vq2* are zero, and in a case where the resistance error or the inductance error exists, at least either of the calculation values vd2* and vq2* becomes non-zero. When Formulas (11) and (12) are rearranged, Formulas (13) and (14) are obtained:

$$(R0-R) = -(vd2^* \times id^* + vq2^* \times iq^*) \div (id^{*2} + iq^{*2}) \quad (13)$$

$$(L0-L) = (vd2^* \times iq^* - vq2^* \times id^*) \div \{\omega r \times (id^{*2} + iq^{*2})\} \quad (14)$$

In order to evaluate the armature resistance R and the armature inductance L which are the electrical constants of the AC rotary machine 1, in the first embodiment, let's consider a case where the conditions of id*=0 and iq*=(a plus constant value) are given and where ωr >0 holds. When id*=0 is substituted into Formulas (13) and (14), Formulas (15) and (16) are obtained:

$$(R0-R) = -(vq2^* \div iq^*) \quad (15)$$

$$(L0-L) = vd2^* \div (\omega r \times iq^*) \quad (16)$$

Since the case of making the q-axial component iq* the plus constant value is considered, the right-hand side of Formula (15) becomes a value proportional to "−vq2*", and the right-hand side of Formula (16) becomes a value proportional to "vd2*÷ωr".

As to the armature resistance, the following facts are revealed from Formula (15):

vq2*<0 holds for (set value R0 of the armature resistance)>(armature resistance R)

vq2*>0 holds for (set value R0 of the armature resistance)<(armature resistance R)

Accordingly, in the case where the calculational value vq2* is plus, the resistance error (R0−R) is brought near to zero by making the set value R0 of the armature resistance large, and in the case where the calculational value vq2* is minus, the resistance error (R0−R) is brought near to zero by making the set value R0 of the armature resistance small.

Likewise, as to the armature inductance, the following facts are revealed from Formula (16):

vd2*>0 for (set value L0 of the armature inductance)> (armature inductance L)

vd2*<0 for (set value L0 of the armature inductance)< (armature inductance L)

Accordingly, in the case where the calculational value vd2* is plus, the inductance error (L0−L) is brought near to zero by making the inductance set value L0 small, and in the case where the calculational value vd2* is minus, the inductance error (L0−R) is brought near to zero by making the inductance set value L0 large.

Considering the above relations, especially the relations between the plus and minus signs of the calculational values vd2* and vq2* and the increases and decreases of the resistance error and the inductance error, the constant measurement means 8 calculates the armature resistance set value R0 and armature inductance set value L0 of the AC rotary machine 1 on the basis of the second voltage commands vd2* and vq2* in conformity with Formulas (17) and (18), and it outputs the calculated values R0 and L0 to the first voltage command calculation means 7:

$$R0 = k_R \int (vq2^*) dt \quad (17)$$

$$L0 = -k_L \int (vd2^*) dt \quad (18)$$

where $k_R$, $k_L$: proportionality constants.

Figure 2:
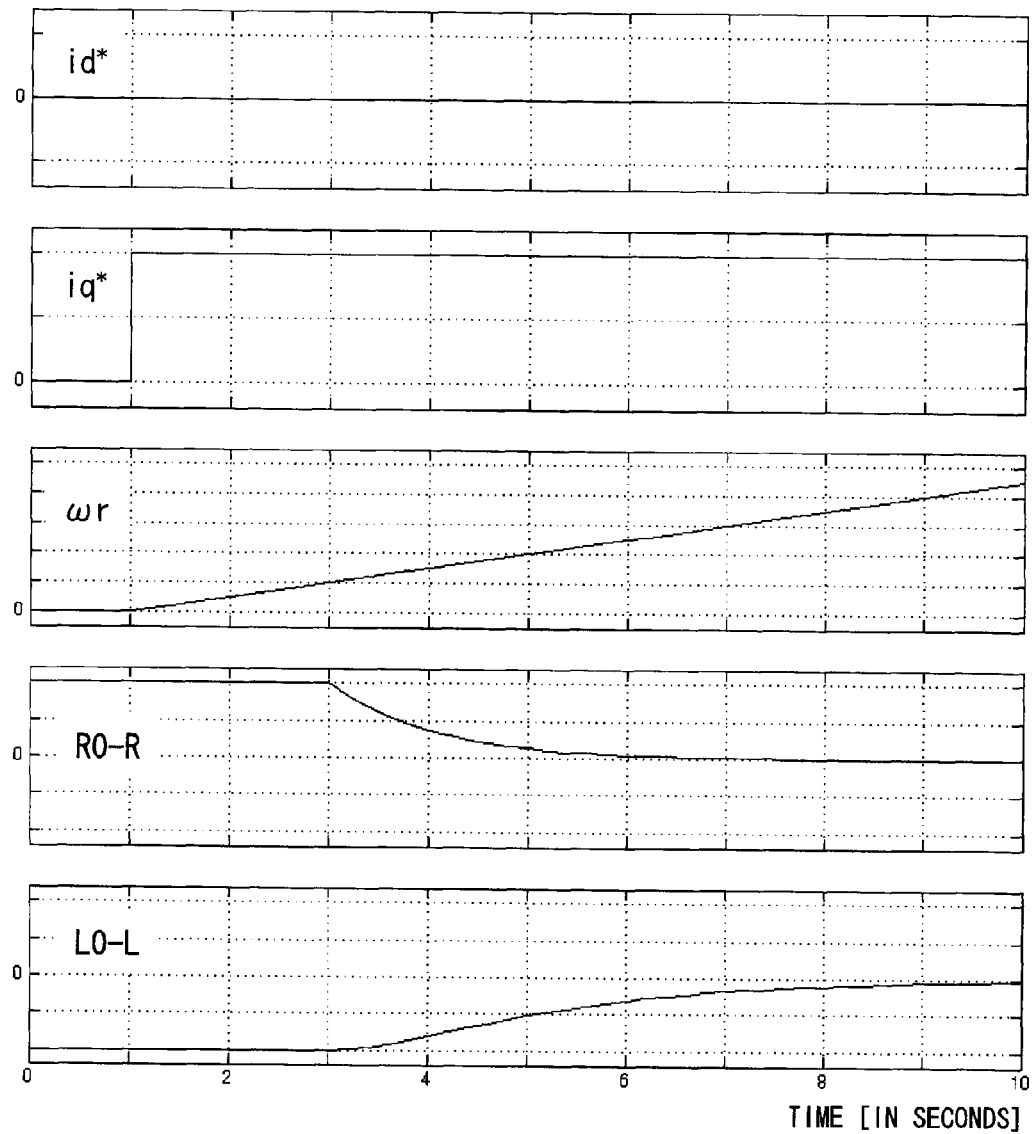
FIG. 2 is a diagram showing examples of operating waveforms in the first embodiment of this invention.

Examples of operating waveforms in the first embodiment are shown in FIG. 2. Referring to the figure, the first stage of the figure shows the d-axial component id* of the current command, the second stage the q-axial component iq* of the current command, the third stage the angular frequency ωr of the AC rotary machine 1, the fourth stage the resistance error (R0−R), and the fifth stage the inductance error (L0−L).

During a period from a time of 0 second to a time of 1 second, the AC rotary machine 1 is in a stopped state, and the current commands id* and iq* are zero. Since the time of 1 second, the command iq* holds a plus constant value, and simultaneously, the angular frequency ωr of the AC rotary machine 1 is gradually increased. The constant measurement means 8 is stopped operating until a time of 3 seconds is reached. When the time of 3 seconds has been reached, the constant measurement means 8 calculates the armature resistance set value R0 on the basis of the second voltage command vq2* in conformity with Formula (17), whereby the set value R0 comes near to the armature resistance R, and the resistance error (R0−R) converges into zero.

Regarding also the armature inductance, when the time of 3 seconds has been reached, the constant measurement means 8 calculates the armature inductance set value L0 on the basis of the second voltage command vd2* in conformity with Formula (18), whereby the set value L0 comes near to the armature inductance L, and the inductance error (L0−L) converges into zero.

As understood from Formulas (11) and (12), when the angular frequency ωr is smaller than a predetermined value near zero, the second terms of the right-hand sides of both the formulas come near to zero, irrespective of the magnitude of the inductance error (L0−L), and neither of the errors (R0−R) and (L0−L) can be evaluated.

Accordingly, the constant measurement means 8 calculates the electrical constants of the AC rotary machine 1 at and after the time of 3 seconds where the magnitude of the angular frequency ω becomes larger than the predetermined value, and it stops the calculations of the electrical constants before the time of 3 seconds where the magnitude of the desired angular frequency ω is smaller than the predetermined value. Thus, in the case where the angular frequency ω is small and where the electrical constants cannot be precisely measured, the degradation of a control performance attributed to the errors of the constants is preventable.

Besides, the prior-art control apparatus for the AC rotary machine has calculated the electrical constants by employing only the addition, subtraction, multiplication and division among voltages, currents and an angular frequency, and it has therefore had the problem that the influences of noises involved in the voltages, currents and angular frequency appear in the armature resistance set value and the armature inductance set value. In contrast, the calculations based on Formulas (17) and (18) in the first embodiment obtain the set values of the armature resistance and armature inductance by the integral calculations of the second voltage commands. Therefore, the first embodiment prevents the noises of the voltage detection values and current detection values from being directly reflected, and it can solve the problem that the measured constants are influenced by the noises.

As described above, owing to the configuration of the first embodiment, there is the advantage that the constant measurement means 8 measures the constants of the AC rotary machine 1 while the control is being performed so that the currents on the rotating two-axis coordinates (d-q axes) may agree with the current commands on the rotating two-axis coordinates (d-q axes), whereby the electrical constants for use in the first voltage command calculation means 7 can be set.

Besides, in the first embodiment, the constant measurement means 8 calculates the electrical constants of the AC rotary machine 1 on the basis of the second voltage commands which the second voltage command calculation means 9 outputs in the case where the magnitude of the d-axial component of the current command on the rotating two-axis coordinates (d-q axes) is made zero and where the magnitude of the q-axial component is held constant. Therefore, the first embodiment has the advantage that the two sorts of electrical constants such as the armature resistance and the armature inductance can be measured.

Besides, the armature inductance set value and the armature resistance set value of the AC rotary machine 1 as have been calculated on the basis of the second voltage commands outputted from the second voltage command calculation means 9 are outputted to the first voltage command calculation means 7. Therefore, the first embodiment has the advantage that the control precision of the control apparatus for the AC rotary machine 1 is enhanced.

Further, the set values of the armature resistance and armature inductance are obtained by the integral calculations based on the second voltage commands. Therefore, the first embodiment has the advantage that the noises of the voltage detection values and current detection values can be prevented from being directly reflected, to solve the problem that the measured constants are also influenced by the noises.

Second Embodiment

In the foregoing first embodiment, the constant measurement means 8 has calculated the armature resistance set value R0 and armature inductance set value L0 of the AC rotary machine 1 on the basis of the second voltage commands vd2* and vq2*, in conformity with Formulas (17) and (18). In the second embodiment here, the armature resistance set value R0 and the armature inductance set value L0 are calculated using the q-axial component iq* of the current command and the angular frequency ωr in addition to the second voltage commands vd2* and vq2*.

Although the second embodiment becomes somewhat more complicated in configuration and calculations as compared with the first embodiment, the settings of the quantities iq* and ωr become as desired in the former. Therefore, the second embodiment has the merit that the degree of freedom of running conditions for measuring the set values R0 and L0 heightens accordingly, so the application of this second embodiment becomes easier.

Figure 3:
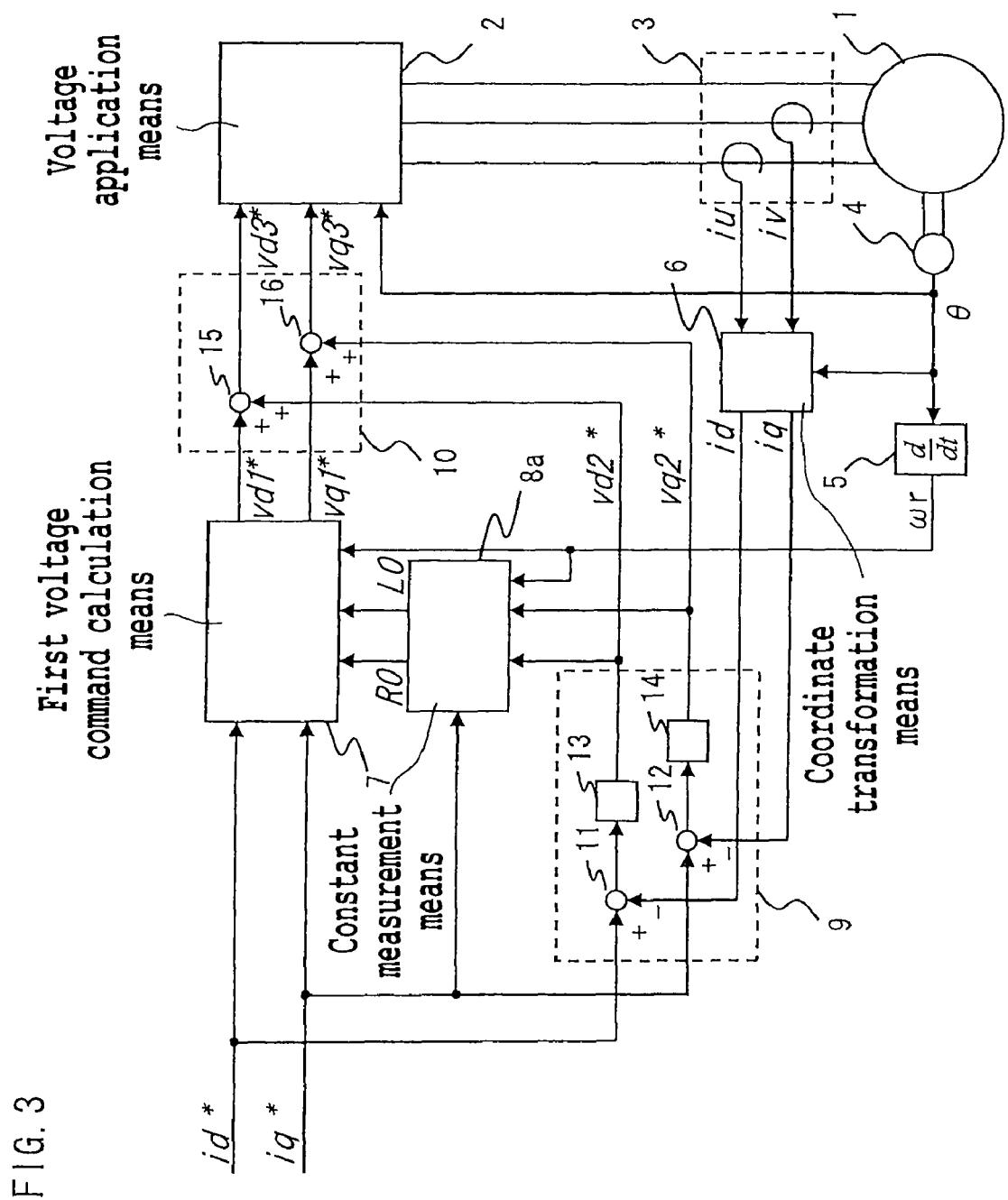
FIG. 3 is a block diagram showing the configuration of a control apparatus for an AC rotary machine according to a second embodiment of this invention.

FIG. 3 is a block diagram showing the configuration according to the second embodiment of this invention. Constant measurement means 8a calculates the armature resistance set value R0 and the armature inductance set value L0 on the basis of the q-axial component iq* of the current command and the angular frequency ωr, in addition to the second voltage commands vd2* and vq2*, thereby to output the set values R0 and L0 to first voltage command calculation means 7. By the way, in FIG. 3, parts to which the same numerals and signs as in FIG. 1 are assigned are identical or equivalent parts, and the individual descriptions of the overlapping parts shall be omitted.

In the second embodiment, let's consider the case of giving the condition of id*=0. Formulas (15) and (16) mentioned before will be respectively listed as Formulas (19) and (20) again:

$$(R0-R) = -(vq2^* \div iq^*) \quad (19)$$

$$(L0-L) = vd2^* \div (\omega r \times iq^*) \quad (20)$$

The right-hand side of Formula (19) is proportional to the magnitude of "−vq2*", and is inversely proportional to the magnitude of "iq*". The q-axial component iq* has been set at the plus constant value in the first embodiment, but it is not limited to the plus constant value in the second embodiment. Even in this case, it may well be said that the right-hand side of Formula (19) is proportional to "−(vq2*÷iq*)".

Besides, the right-hand side of Formula (20) is proportional to the magnitude of "vd2*" and is inversely proportional to the magnitude of "iq*", and it is inversely proportional to the magnitude of "ωr". In other words, it may well be said that the right-hand side of Formula (20) is proportional to "vd2*÷(ωr×iq*)".

Considering these facts, the constant measurement means 8a shown in the second embodiment supplies the first voltage command calculation means 7 with the armature resistance set value R0 and armature inductance set value L0 of the AC rotary machine 1 calculated on the basis of the second voltage commands vd2* and vq2* in conformity with Formulas (21) and (22):

$$R0 = k_R \int (vq2^* \div iq^*) dt \quad (21)$$

$$L0 = -k_L \int \{vd2^* \div (\omega r \times iq^*)\} dt \quad (22)$$

where $k_R$, $k_L$: proportionality constants.

The first embodiment has accompanied the restriction that the q-axial component iq* has the plus constant value, and that also the angular frequency ωr is plus. In the second embodiment, the constant measurement means 8a uses Formulas (21) and (22) and can therefore calculate the exact armature resistance set value R0 and armature inductance set value L0 irrespective of the sign of the q-axial component iq* and the sign of the angular frequency ωr.

Figure 4:
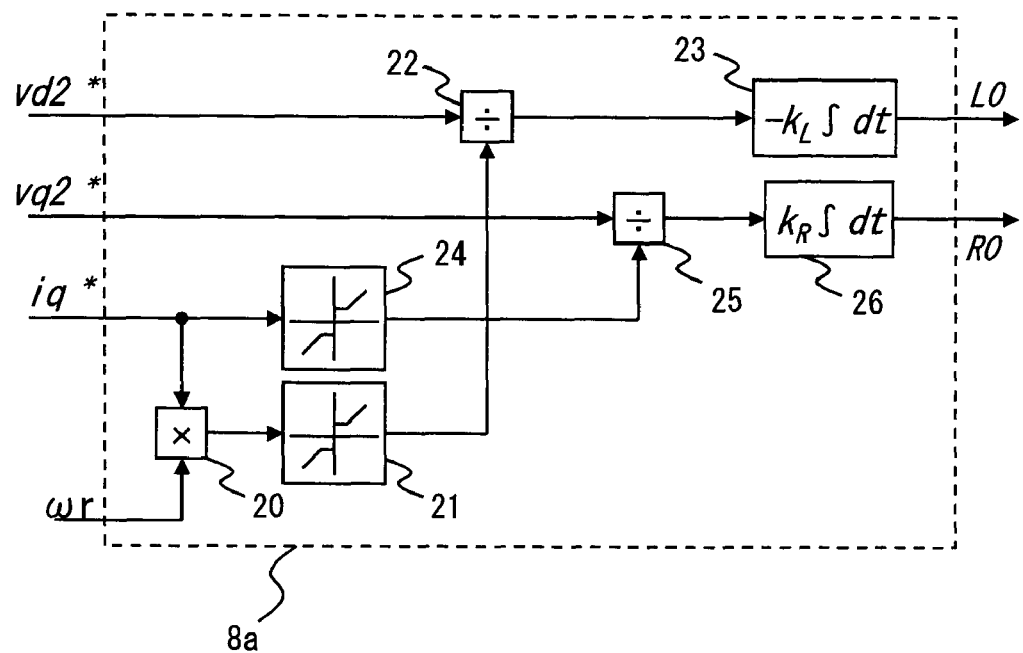
FIG. 4 is a diagram showing the internal configuration of constant measurement means 8a in FIG. 3.

FIG. 4 is a diagram showing the internal configuration of the constant measurement means 8a in the second embodiment. Referring to the figure, a multiplier 20 calculates the product between the q-axial component iq* of the current command and the angular frequency ωr, and it outputs the product to a limiter 21. The limiter 21 executes a limit operation so as to generate, at least, a plus predetermined value in a case where the output of the multiplier 20 is plus, and it executes a limit operation so as to generate, at most, a minus predetermined value in a case where the output of the multiplier 20 is minus, whereby a divider 22 is prevented from executing a division by zero.

The divider 22 divides the d-axial component vd2* of the second voltage command by the output of the limiter 21. An integrator 23 integrates the output value of the divider 22 and multiplies the resulting integral value by $-k_L$, so as to output the resulting product as the armature inductance set value L0. The calculation of Formula (22) can be executed by the series of calculations based on the multiplier 20, limiter 21, divider 22 and integrator 23.

Likewise, a limiter 24 executes a limit operation so as to generate, at least, a plus predetermined value in a case where the q-axial component iq* is plus, and it executes a limit operation so as to generate, at most, a minus predetermined value in a case where the q-axial component iq* is minus, whereby a divider 25 is prevented from executing a division by zero.

The divider 25 divides the q-axial component vq2* of the second voltage command by the output of the limiter 24. An integrator 26 integrates the output value of the divider 25 and multiplies the resulting integral value by $k_R$, so as to output the resulting product as the armature resistance set value R0.

Figure 5:
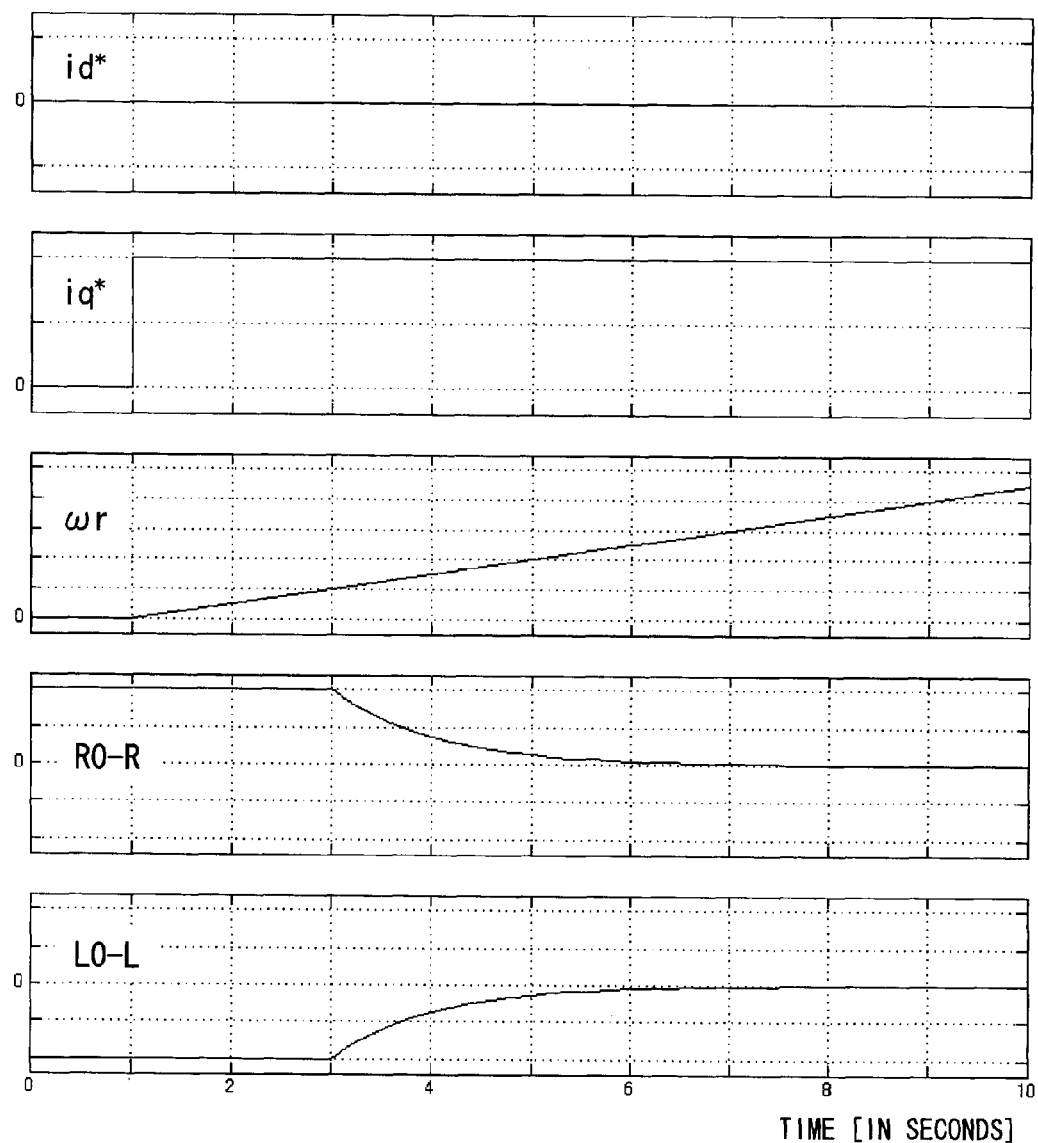
FIG. 5 is a diagram showing examples of operating waveforms in the second embodiment of this invention.

Examples of operating waveforms in the second embodiment are shown in FIG. 5. Referring to the figure, the first stage of the figure shows the d-axial component id* of the current command, the second stage the q-axial component iq* of the current command, the third stage the angular frequency ωr of the AC rotary machine 1, the fourth stage the resistance error (R0−R), and the fifth stage the inductance error (L0−L).

During a period from a time of 0 second to a time of 1 second, the AC rotary machine 1 is in a stopped state, and the current commands id* and iq* are zero. Since the time of 1 second, the command iq* holds a plus constant value, and simultaneously, the angular frequency ωr of the AC rotary machine 1 is gradually increased. The constant measurement means 8a is stopped operating until a time of 3 seconds is reached. When the time of 3 seconds has been reached, the constant measurement means 8a calculates the armature resistance set value R0 on the basis of the second voltage command vq2* in conformity with Formula (21), whereby the set value R0 comes near to the armature resistance R, and the resistance error (R0−R) converges into zero.

Regarding also the armature inductance, when the time of 3 seconds has been reached, the constant measurement means 8a calculates the armature inductance set value L0 on the basis of the second voltage command vd2* in conformity with Formula (22), whereby the set value L0 comes near to the armature inductance L, and the inductance error (L0−L) converges into zero.

Here, when FIG. 5 is compared with FIG. 3 in the foregoing first embodiment, the convergibility of the inductance error (L0−L) is enhanced. In the first embodiment, the calculation of the inductance set value has been based on Formula (18). More specifically, the second voltage command vd2* is proportional to the magnitude of the angular frequency ωr. Therefore, in a case where the angular frequency ωr is small, also the value of the second voltage command vd2* is small in spite of the existence of the inductance error (L0−L), so that the convergibility of the inductance error (L0−L) has been inferior.

In the second embodiment, the calculation of the inductance set value is executed on the basis of Formula (22), so that the convergibility of the inductance error (L0−L) is enhanced. Likewise, even in a case where the magnitude of the current command iq* changes, the convergibilities of the resistance error (R0−R) and the inductance error (L0−L) can be held constant irrespective of the magnitude of the current command iq* by employing the constant measurement means 8a shown in the second embodiment, and the respective convergibilities can be enhanced by giving the appropriate proportionality constants $k_R$ and $k_L$.

As described above, in the second embodiment, the constant measurement means 8a calculates the armature resistance set value R0 and the armature inductance set value L0 on the basis of the second voltage commands vd2* and vq2*, the q-axial component iq* of the current command, and the angular frequency ωr. Therefore, the second embodiment has the advantage that the exact armature resistance set value and armature inductance set value are obtained irrespective of the signs and magnitudes of the q-axial component iq* of the current command and the angular frequency ωr.

Besides, the calculations of the armature resistance set value and the armature inductance set value divide the second voltage commands by the current command. Therefore, the second embodiment has the advantage that the convergibility of the resistance error (R0−R) and the convergibility of the inductance error (L0−L) are enhanced irrespective of the magnitude of the current command.

Besides, the armature inductance set value is calculated on the basis of the value obtained by dividing the second voltage command vd2* by the angular frequency ωr. Therefore, the second embodiment has the advantage that the convergibility of the inductance error (L0−L) is enhanced irrespective of the angular frequency ωr.

Third Embodiment

The AC rotary machine 1 in the forgoing first or second embodiment has been the synchronous machine, and especially the case of the synchronous machine of the surface magnet type has been handled. In the third embodiment of this invention, an AC rotary machine 1b is a synchronous machine, and especially the case of the synchronous machine of embedded magnet type will be described. The embedded magnet type synchronous machine has a permanent magnet embedded therein. Therefore, the magnetic circuit shape of a rotor is not axially symmetric, but a so-called "saliency" is demonstrated.

Figure 6:
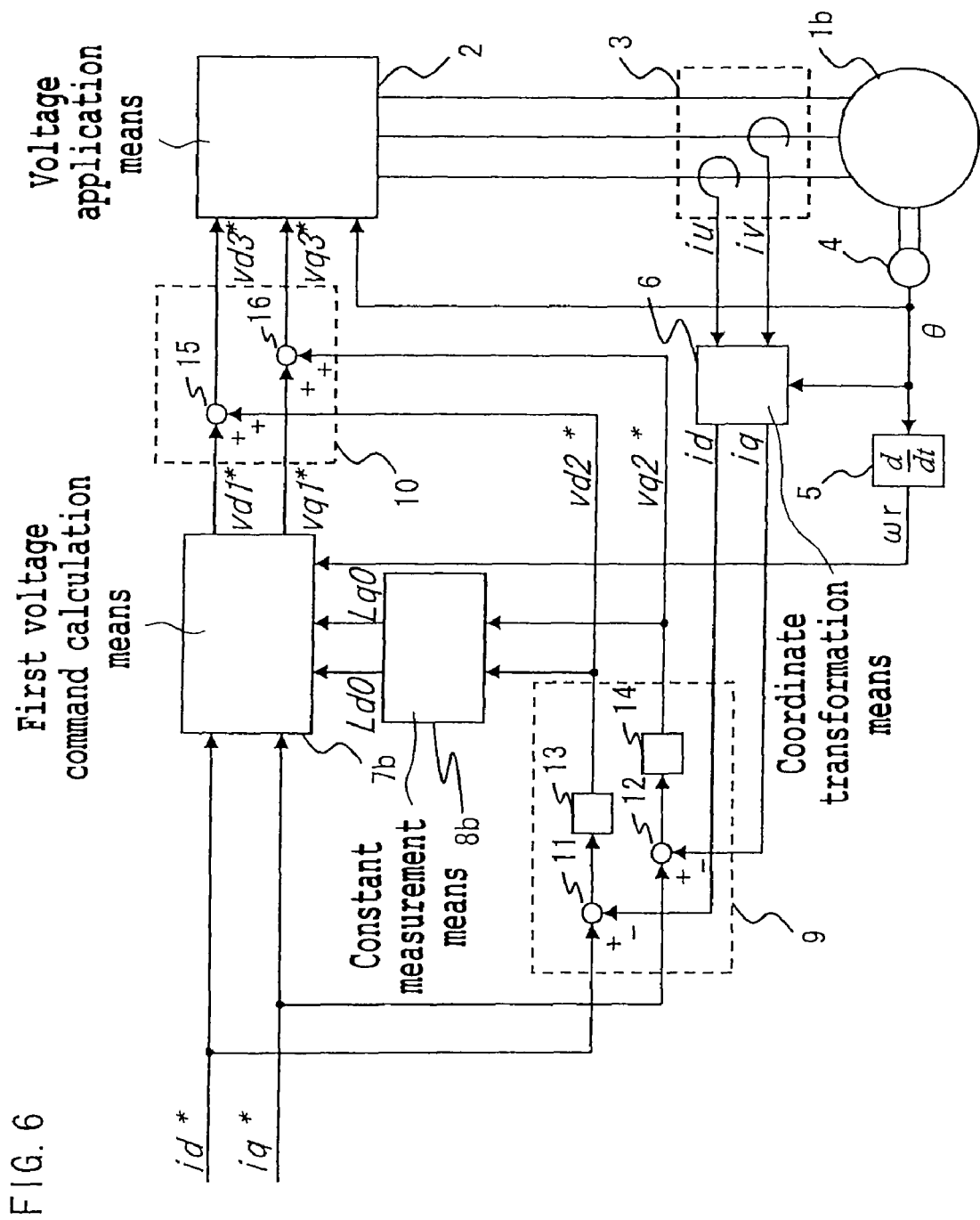
FIG. 6 is a block diagram showing the configuration of a control apparatus for an AC rotary machine according to a third embodiment of this invention.

FIG. 6 is a block diagram showing a configuration according to the third embodiment of this invention. The AC rotary machine 1b is the synchronous machine, which is the synchronous machine of the embedded magnet type. Constant measurement means 8b calculates the d-axial component set value Ld0 of the armature inductance of the AC rotary machine 1b and the q-axial component set value Lq0 of the armature inductance of the AC rotary machine 1b, thereby to output the set values Ld0 and Lq0 to first voltage command calculation means 7b. By the way, in FIG. 6, parts to which the same numerals and signs as in FIG. 1 are assigned are identical or equivalent parts, and the individual descriptions of the overlapping parts shall be omitted.

The AC rotary machine 1b is the embedded magnet type synchronous machine, and in a case where the d-axis of rotating orthogonal coordinates (d-q axes) coincides with the rotor magnetic flux of the AC rotary machine 1b, the following formulas hold:

$$vd = R \times id - \omega r \times Lq \times iq \quad (23)$$

$$vq = R \times iq + \omega r \times (Ld \times id + \phi f) \quad (24)$$

where:
Ld: d-axial component of the armature inductance of the AC rotary machine 1b,
Lq: q-axial component of the armature inductance of the AC rotary machine 1b.

On the other hand, the first voltage command calculation means 7b generates and outputs first voltage commands vd1* and vq1* on the rotating two-axis coordinates (d-q axes), in conformity with Formulas (25) and (26) which are based on current commands id* and iq* on the rotating two-axis coordinates (d-q axes) and an angular frequency ωr:

$$vd1^* = R0 \times id^* - \omega r \times Lq0 \times iq^* \quad (25)$$

$$vq1^* = R0 \times iq^* + \omega r \times (Ld0 \times id^* + \phi f0) \quad (26)$$

Here, description will be made assuming that the amplitude of the rotor magnetic flux of the AC rotary machine 1b and the armature resistance of the AC rotary machine 1b are known, and as to a case where $\phi f0 = \phi f$ and R0=R hold.

In the same manner as in the case of the foregoing first embodiment, operations to be stated below can be verified at the point of time at which, under the steady-state operation of the above control system, the absolute values of second voltage command calculation values vd2* and vq2* being the outputs of second voltage command calculation means 9 have entered a predetermined range near zero.

More specifically, in the second voltage command calculation means 9, the d-axial component id* of the current command and the d-axial component id of the current of the AC rotary machine 1b are brought into agreement, and the q-axial component iq* of the current command and the q-axial component iq of the current are brought into agreement. Besides, voltage application means 2 applies voltages to the AC rotary machine 1b on the basis of third voltage commands vd3* and vq3* outputted from third voltage command calculation means 10, so that the d-axial component vd and q-axial component vq of the voltages of the AC rotary machine 1b agree with the third voltage commands vd3* and vq3*, respectively. Considering these relations, Formulas (27) to (32) hold:

$$vd3^* = vd2^* + R0 \times id^* - \omega r \times Lq0 \times iq^* \quad (27)$$

$$vq3^* = vq2^* + R0 \times iq^* + \omega r \times (Ld0 \times id^* + \phi f0) \quad (28)$$

$$id = id^* \quad (29)$$

$$iq = iq^* \quad (30)$$

$$vd = vd3^* \quad (31)$$

$$vq = vq3^* \quad (32)$$

When the above relational formulas are rearranged, Formulas (33) and (34) are obtained:

$$vd2^* = \omega r \times (Lq0 - Lq) \times iq^* \quad (33)$$

$$vq2^* = -\omega r \times (Ld0 - Ld) \times id^* \quad (34)$$

According to Formulas (33) and (34), in a case where neither of a d-axial inductance error (Ld0−Ld) and a q-axial inductance error (Lq0−Lq) exists, the second voltage command calculation values vd2* and vq2* are zero, and in a case where the d-axial inductance error or the q-axial inductance error exists, at least either of the calculation values vd2* and vq2* becomes non-zero. When Formulas (33) and (34) are rearranged, Formulas (35) and (36) are obtained:

$$(Ld0 - Ld) = -vq2^* \div (\omega r \times id^*) \quad (35)$$

$$(Lq0 - Lq) = vd2^* \div (\omega r \times iq^*) \quad (36)$$

In the third embodiment, let's consider a case where the conditions of id*=(minus constant value) and iq*=−id* are respectively given and where or >0 holds.

From Formula (35), the following facts are revealed as to the d-axial component of the armature inductance:

vq2*>0 for (Ld0)>(Ld)
vq2*<0 for (Ld0)<(Ld)

Accordingly, in a case where the second voltage command calculation value vq2* is plus, the d-axial inductance error (Ld0−Ld) comes near to zero when the d-axial component set value Ld0 of the armature inductance is made small, and in a case where the calculation value vq2* is minus, the d-axial inductance error (Ld0−Ld) comes near to zero when the d-axial component set value Ld0 of the armature inductance is made large.

Likewise, from Formula (36), the following facts are revealed as to the q-axial component of the armature inductance:

vd2*>0 for (Lq0)>(Lq)
vd2*<0 for (Lq0)<(Lq)

Accordingly, in a case where the second voltage command calculation value vd2* is plus, the q-axial inductance error (Lq0−Lq) comes near to zero when the q-axial component set value Lq0 is made small, and in a case where the command calculation value vd2* is minus, the q-axial inductance error (Lq0−Lq) comes near to zero when the set value Lq0 is made large.

Using the above relations, the constant measurement means 8*b* supplies the first voltage command calculation means 7*b* with the d-axial component Ld0 and q-axial component Lq0 of the armature inductance set values of the AC rotary machine 1*b* as have been calculated on the basis of the second voltage commands vd2* and vq2* in conformity with Formulas (37) and (38):

$$Ld0 = -k_{Ld}\int (vq2^*)dt \quad (37)$$

$$Lq0 = -k_{Lq}\int (vd2^*)dt \quad (38)$$

where $k_{Ld}$, $k_{Lq}$: proportionality constants.

Figure 7:
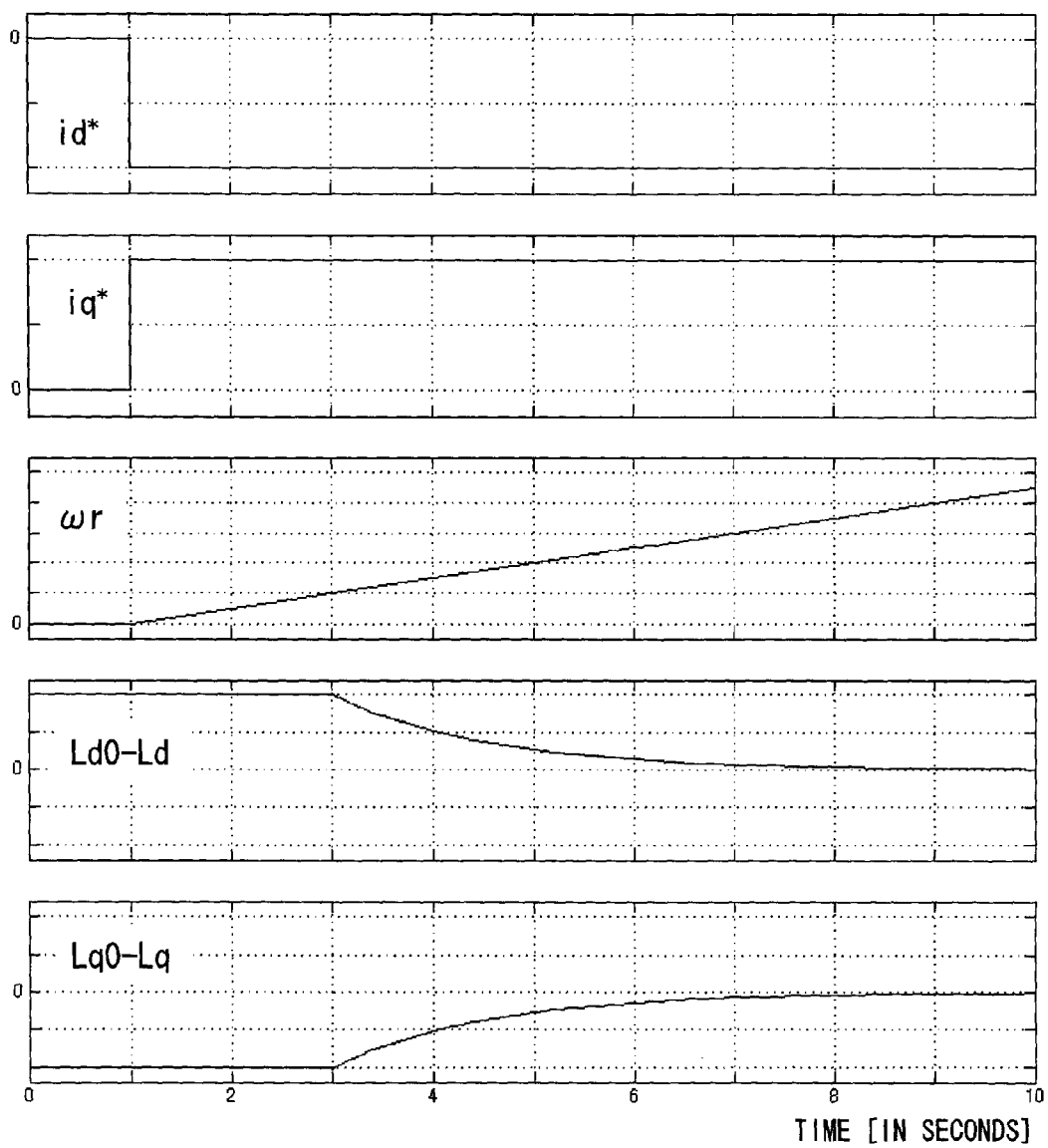
FIG. 7 is a diagram showing examples of operating waveforms in the third embodiment of this invention.

Examples of operating waveforms in the third embodiment are shown in FIG. 7. Referring to the figure, the first stage of the figure shows the d-axial component id* of the current command, the second stage the q-axial component iq* of the current command, the third stage the angular frequency ωr of the AC rotary machine 1*b*, the fourth stage the d-axial inductance error (Ld0−Ld), and the fifth stage the q-axial inductance error (Lq0−Lq).

During a period from a time of 0 second to a time of 1 second, the AC rotary machine 1*b* is in a stopped state, and the current commands id* and iq* are zero. Since the time of 1 second, the command id* holds a minus constant value, while the command iq* holds a plus constant value, and simultaneously, the angular frequency ωr of the AC rotary machine 1*b* is gradually increased by a generated torque. The constant measurement means 8*b* is stopped operating until a time of 3 seconds is reached. When the time of 3 seconds has been reached, the constant measurement means 8*b* calculates the d-axial component Ld0 of the armature inductance set value on the basis of the second voltage command vq2*, whereby the d-axial component Ld0 comes near to the d-axial component Ld of the armature inductance, and the inductance error (Ld0−L) converges into zero.

Regarding also the q-axial component of the armature inductance, when the time of 3 seconds has been reached, the constant measurement means 8*b* calculates the q-axial component Lq0 of the armature inductance set value on the basis of the second voltage command vd2*, whereby the q-axial component Lq0 comes near to q-axial component Lq of the armature inductance, and the q-axial inductance error (Lq0−Lq) converges into zero.

As described above, in the third embodiment, the constant measurement means 8*b* calculates the electrical constants of the AC rotary machine 1*b* on the basis of the second voltage commands outputted from the second voltage command calculation means 9, while the d-axial component of the current command on the rotating two-axis coordinates (d-q axes) is held at the minus constant value and while the q-axial component of the current command is held at the plus constant value. Therefore, the third embodiment has the advantage that the two sorts of electrical constants such as the d-axial component and q-axial component of the armature inductance can be measured.

Besides, the AC rotary machine 1*b* is the synchronous machine having the saliency, and the q-axial inductance value of the AC rotary machine 1*b* calculated on the basis of the d-axial component of the second voltage command outputted from the second voltage command calculation means 9, and the d-axial inductance value of the AC rotary machine 1*b* calculated on the basis of the q-axial component of the second voltage command are outputted to the first voltage command calculation means 7*b*. Therefore, the third embodiment brings that the constant measurement means 8*b* can measure the d-axial inductance value and q-axial inductance value of the synchronous machine having the saliency, so as to set the measured inductance values as the electrical constants of the first voltage command calculation means 7*b*.

Fourth Embodiment

In the foregoing third embodiment, the constant measurement means 8*b* has calculated the d-axial component Ld0 and q-axial component Lq0 of the armature inductance set values of the AC rotary machine 1*b* on the basis of the second voltage commands vd2* and vq2* in conformity with Formulas (37) and (38). In this regard, the d-axial component Ld0 and q-axial component Lq0 of the armature inductance set values may well be calculated on the basis of the second voltage commands vd2* and vq2*, the d-axial component id* and q-axial component iq* of the current commands, and the angular frequency ωr.

Figure 8:
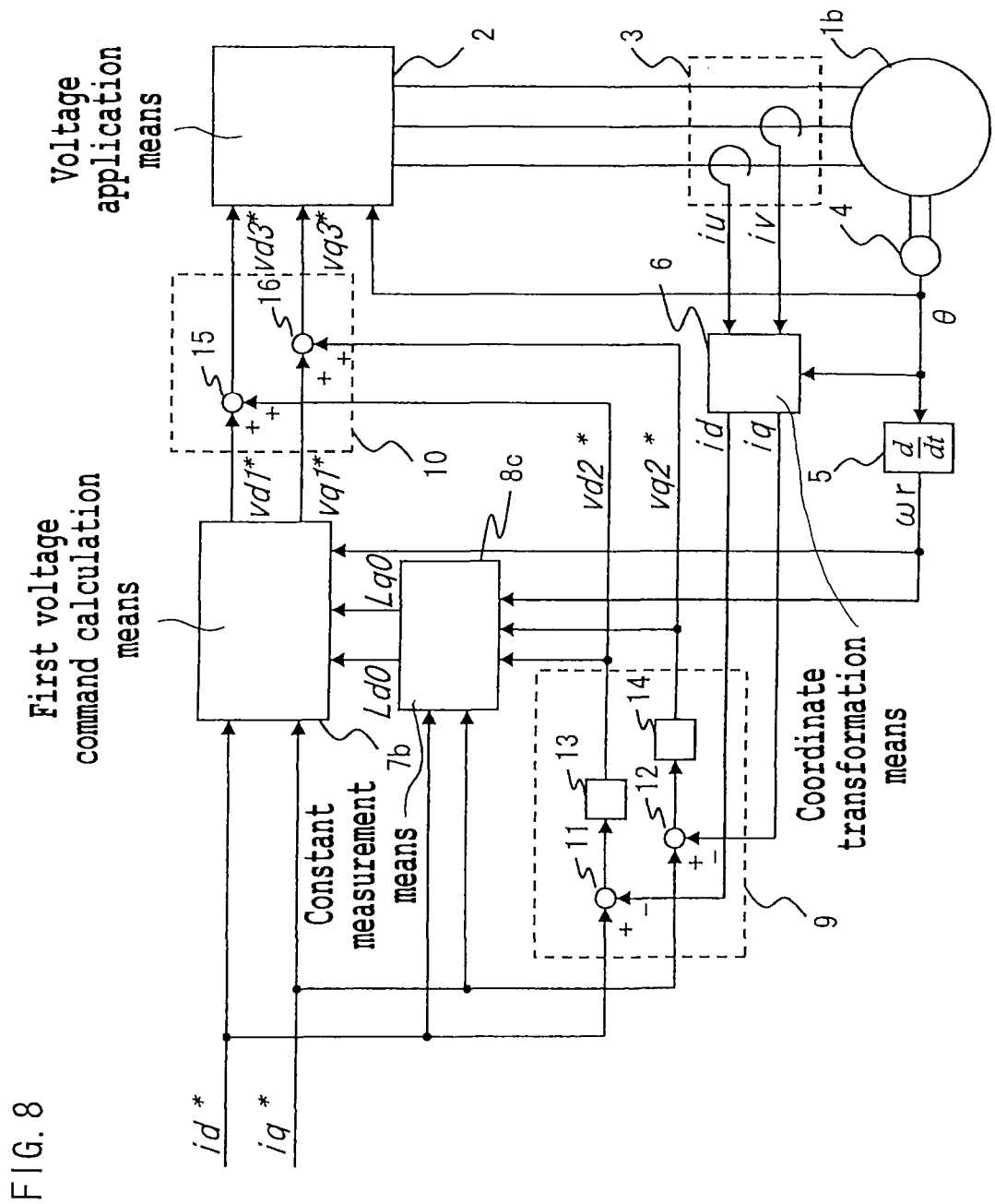
FIG. 8 is a block diagram showing the configuration of a control apparatus for an AC rotary machine according to a fourth embodiment of this invention.

FIG. 8 is a block diagram showing a configuration according to the fourth embodiment of this invention. Here, constant measurement means 8*c* calculates the d-axial component set value Ld0 of an armature inductance and the q-axial component set value Lq0 of the armature inductance, on the basis of the second voltage commands vd2* and vq2*, the current commands id* and iq*, and the angular frequency ωr, so as to output the set values Ld0 and Lq0 to first voltage command calculation means 7*b*. By the way, in FIG. 8, parts to which the same numerals and signs as in FIG. 6 are assigned are identical or equivalent parts, and the individual descriptions of the overlapping parts shall be omitted.

Formulas (35) and (36) mentioned before will be respectively listed as Formulas (39) and (40) again:

$$(Ld0-Ld) = -vq2^* \div (\omega r \times id^*) \quad (39)$$

$$(Lq0-Lq) = vd2^* \div (\omega r \times iq^*) \quad (40)$$

The right-hand side of Formula (39) is proportional to the magnitude of "−vq2*" and is inversely proportional to the magnitude of "id*", and it is inversely proportional to the magnitude of "ωr". Besides, the right-hand side of Formula (40) is proportional to the magnitude of "vd2*" and is inversely proportional to the magnitude of "iq*", and it is inversely proportional to the magnitude of "ωr". Considering these facts, the constant measurement means 8*c* shown in the fourth embodiment supplies the first voltage command calculation means 7*b* with the d-axial component set value Ld0 of the armature inductance and the q-axial component set value Lq0 of the armature inductance calculated on the basis of the second voltage commands vd2* and vq2* by utilizing Formulas (41) and (42):

$$Ld0 = -k_{Ld}\int \{vq2^* \div (\omega r \times id^*)\}dt \quad (41)$$

$$Lq0 = -k_{Lq}\int \{vd2^* \div (\omega r \times iq^*)\}dt \quad (42)$$

where $k_{Ld}$, $k_{Lq}$: proportionality constants.

The foregoing third embodiment has accompanied the restriction that the conditions of id*=(minus constant value) and iq*=−id* are respectively given, and that also the angular frequency ωr is plus. In contrast, in the fourth embodiment, the constant measurement means 8*c* uses Formulas (41) and (42) and can therefore calculate the exact d-axial component set value Ld0 and q-axial component set value Lq0 of the armature inductance irrespective of the signs of the components id* and iq* and the sign of the angular frequency ωr.

Figure 9:
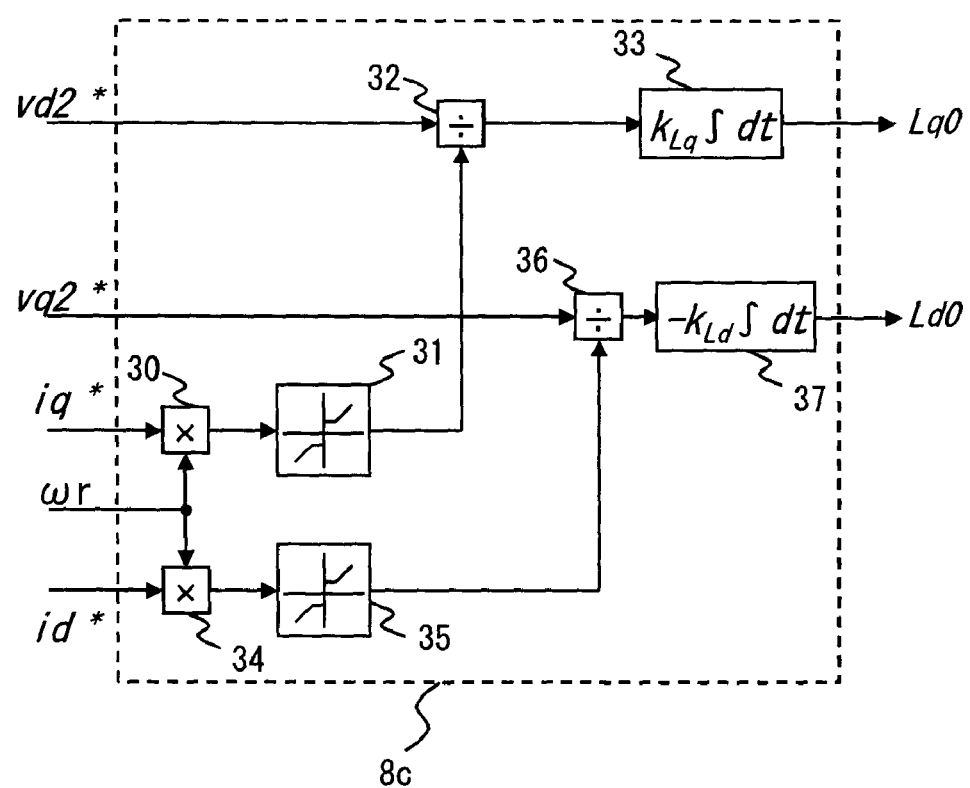
FIG. 9 is a diagram showing the internal configuration of constant measurement means 8c in FIG. 8.

FIG. 9 is a diagram showing the internal configuration of the constant measurement means 8c in the fourth embodiment. Referring to the figure, a multiplier 30 calculates the product between the q-axial component iq* of the current command and the angular frequency ωr, and it outputs the product to a limiter 31. The limiter 31 executes a limit operation so as to generate, at least, a plus predetermined value in a case where the output of the multiplier 30 is plus, and it executes a limit operation so as to generate, at most, a minus predetermined value in a case where the output of the multiplier 30 is minus, whereby a divider 32 is prevented from executing a division by zero.

The divider 32 divides the d-axial component vd2* of the second voltage command by the output of the limiter 31. An integrator 33 integrates the output value of the divider 32 and multiplies the resulting integral value by $-k_{Lq}$, so as to output the resulting product as the q-axial component Lq0 of the armature inductance set value. The calculation of Formula (42) can be executed by the series of calculations based on the multiplier 30, limiter 31, divider 32 and integrator 33.

Likewise, a multiplier 34 calculates the product between the d-axial component id* of the current command and the angular frequency ωr, and it outputs the product to a limiter 35. The limiter 35 executes a limit operation so as to generate, at least, a plus predetermined value in a case where the output of the multiplier 34 is plus, and it executes a limit operation so as to generate, at most, a minus predetermined value in a case where the output of the multiplier 34 is minus, whereby a divider 36 is prevented from executing a division by zero.

The divider 36 divides the q-axial component vq2* of the second voltage command by the output of the limiter 35. An integrator 37 integrates the output value of the divider 36 and multiplies the resulting integral value by $k_{Ld}$, so as to output the resulting product as the d-axial component Ld0 of the armature inductance set value. The calculation of Formula (41) can be executed by the series of calculations based on the multiplier 34, limiter 35, divider 36 and integrator 37.

As described above, in the fourth embodiment, the constant measurement means 8c calculates the d-axial component set value Ld0 of the armature inductance and the q-axial component set value Lq0 of the armature inductance on the basis of the second voltage commands vd2* and vq2*, current commands id* and iq*, and angular frequency ωr. Therefore, the fourth embodiment has the advantage that the exact armature inductance set values are obtained irrespective of the signs and magnitudes of the current commands id* and iq* and angular frequency ωr.

Besides, the armature inductance set values are obtained by dividing the second voltage commands by the current commands. Therefore, the fourth embodiment has the advantage that the convergibilities of the d-axial inductance error (Ld0−Ld) and the q-axial inductance error (Lq0−Lq) are enhanced irrespective of the magnitudes of the current commands.

Besides, the armature inductance set value is calculated on the basis of the value obtained by dividing the second voltage command vd2* by the angular frequency ωr. Therefore, the fourth embodiment has the advantage that the convergibilities of the d-axial inductance error (Ld0−Ld) and the q-axial inductance error (Lq0−Lq) are enhanced irrespective of the angular frequency ωr.

Fifth Embodiment

The foregoing embodiments have been described concerning the case where the amplitude and phase of the rotor magnetic flux are known.

More specifically, the "case where the amplitude of the rotor magnetic flux is known" signifies a case where φf0=φf holds in relation to the rotor magnetic flux. This case corresponds to, for example, a case where the induced voltage constants of the rotary machine have been obtained beforehand by the simple product test of the AC rotary machine, or the like.

Besides, the "case where the phase of the rotor magnetic flux is known" signifies a case where the relationship between the absolute position of the position sensor and the rotor magnetic flux is uniquely determined. A concrete example is a case where, when the position sensor such as an encoder is mounted, a mounting operation is performed in consideration of the phase of the rotor magnetic flux, or a case where the relationship between an induced voltage and the rotational position has been obtained beforehand by the simple product test of the rotary machine, or the like as is performed after the mounting of the encoder.

The "case where the amplitude of the rotor magnetic flux is not known" is such a case where the simple product test of the rotary machine, or the like cannot be performed for, for example, the existing rotary machine installed in a plant. Besides, the "case where the phase of the rotor magnetic flux is not known" is a case where the "0 degree" of the encoder or the like position sensor and the rotor magnetic flux are not coincident. In the case where the amplitude or phase of the rotor magnetic flux is not known in, for example, the foregoing first embodiment in which the amplitude and phase of the rotor magnetic flux need to be known, the amplitude and phase are made known by the fifth embodiment of this invention. Thus, there is the merit that an expansion into the first embodiment is permitted.

In the fifth embodiment, the AC rotary machine 1b is a synchronous machine, and especially the case where amplitude and phase of the rotor magnetic flux are unknown will be described.

Figure 10:
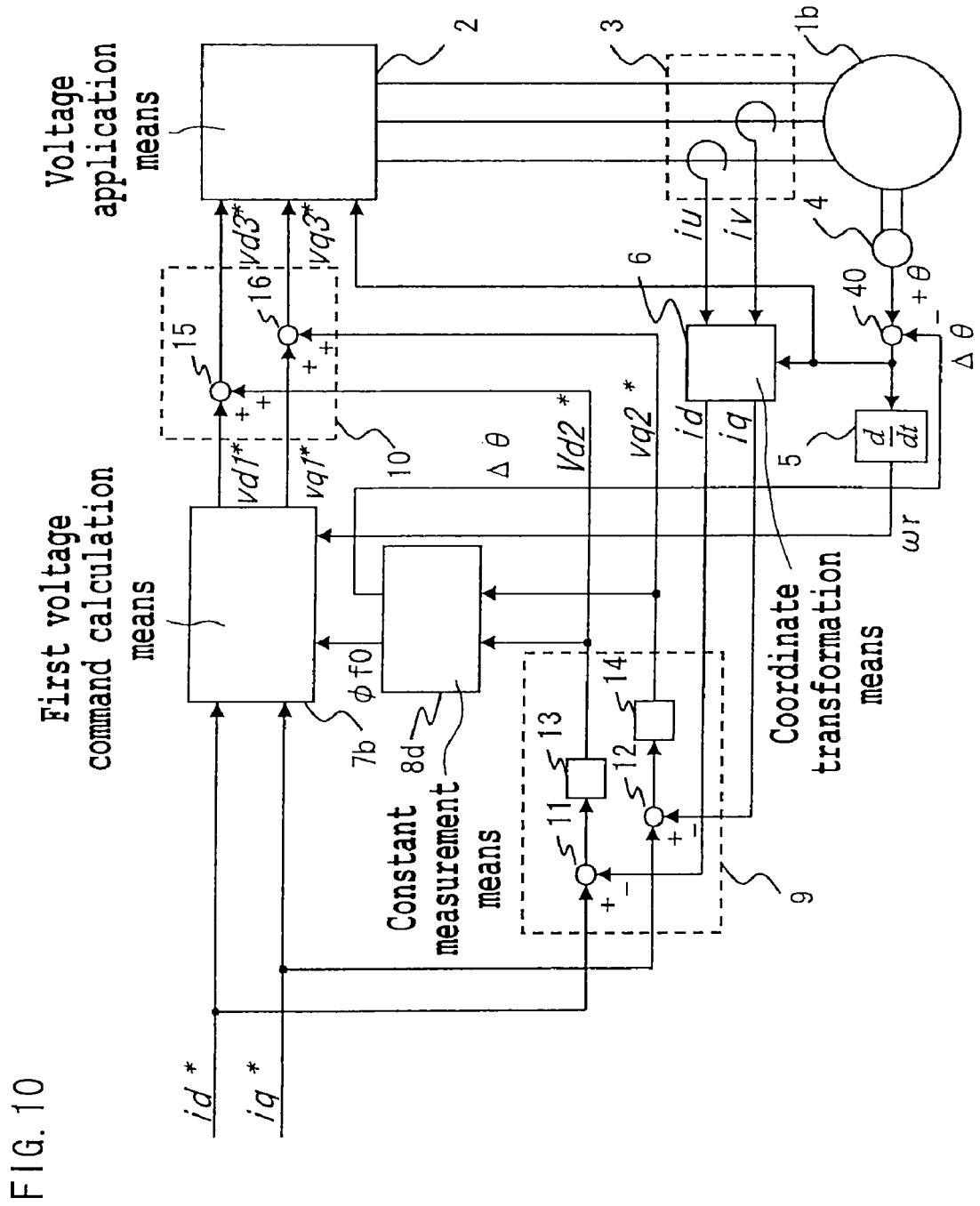
FIG. 10 is a block diagram showing the configuration of a control apparatus for an AC rotary machine according to a fifth embodiment of this invention.

FIG. 10 is a block diagram showing a configuration according to the fifth embodiment of this invention. Constant measurement means 8d calculates the magnetic flux amplitude set value φf0 of the AC rotary machine 1b and the phase difference Δθ between the d-axis of rotating orthogonal coordinates (d-q axes) and the rotor magnetic flux of the AC rotary machine 1b, so as to output the set value φf0 to first voltage command calculation means 7b and to output the phase difference Δθ to a subtracter 40. By the way, in FIG. 10, parts to which the same numerals and signs as in FIG. 6 are assigned are identical or equivalent parts, and the individual descriptions of the overlapping parts shall be omitted.

The AC rotary machine 1b is the synchronous machine of embedded magnet type, and in a case where the phase difference Δθ exists between the d-axis of the rotating orthogonal coordinates (d-q axes) and the rotor magnetic flux of the AC rotary machine 1b, the following formulas hold:

$$vd = R \times id - \omega r \times (Lq \times iq - \phi f \times \sin \Delta\theta) \quad (43)$$

$$vq = R \times iq + \omega r \times (Ld \times id + \phi f \times \cos \Delta\theta) \quad (44)$$

On the other hand, the first voltage command calculation means 7b generates and outputs first voltage commands vd1* and vq1* on the rotating two-axis coordinates (d-q axes), in conformity with Formulas (25) and (26) which are based on current commands id* and iq* on the rotating two-axis coordinates (d-q axes) and an angular frequency ωr. Formulas (25) and (26) will be respectively listed as Formulas (45) and (46) again:

$$vd1^* = R0 \times id^* - \omega r \times Lq0 \times iq^* \quad (45)$$

$$vq1^* = R0 \times iq^* + \omega r \times (Ld0 \times id^* + \phi f0) \quad (46)$$

In the same manner as in the case of the foregoing first embodiment, operations to be stated below can be verified at the point of time at which, under the steady-state operation of the above control system, the absolute values of second voltage command calculation values vd2* and vq2* being the outputs of second voltage command calculation means 9 have entered a predetermined range near zero.

More specifically, in the second voltage command calculation means 9, the d-axial component id* of the current command and the d-axial component id of the current of the AC rotary machine 1b are brought into agreement, and the q-axial component iq* of the current command and the q-axial component iq of the current are brought into agreement. Besides, voltage application means 2 applies voltages to the AC rotary machine 1b on the basis of third voltage commands vd3* and vq3* outputted from third voltage command calculation means 10, so that the d-axial component vd and q-axial component vq of the voltages of the AC rotary machine 1b agree with the third voltage commands vd3* and vq3*, respectively. Considering these relations, Formulas (47) to (52) hold:

$$vd3^* = vd2^* + R0 \times id^* - \omega r \times Lq0 \times iq^* \quad (47)$$

$$vq3^* = vq2^* + R0 \times iq^* + \omega r \times (Ld0 \times id^* + \phi f0) \quad (48)$$

$$id = id^* \quad (49)$$

$$iq = iq^* \quad (50)$$

$$vd = vd3^* \quad (51)$$

$$vq = vq3^* \quad (52)$$

When the relations of Formulas (43) to (52) are rearranged, Formulas (53) and (54) are obtained:

$$vd2^* = -(R0-R) \times id^* + \omega r \times (Lq0-Lq) \times iq^* - \omega r \times \phi f \times \sin \Delta \theta \quad (53)$$

$$vq2^* = -\omega r \times (Ld0-Ld) \times id^* - (R0-R) \times iq^* - \omega r \times (\phi f0 + \phi f \times \cos \Delta \theta) \quad (54)$$

Here, the current commands are given as id*=iq*=0. Incidentally, as will be stated in the later description of operations based on FIG. 11, a concrete manipulation is such that, after the AC rotary machine 1b has been rotated by any method, the condition of id*=iq*=0 is set, whereupon the amplitude and phase of the rotor magnetic flux are measured.

In this case, Formulas (53) and (54) become Formulas (55) and (56), respectively:

$$vd2^* = -\phi f \times \sin \Delta \theta \quad (55)$$

$$vq2^* = -\phi f0 + \phi f \times \cos \Delta \theta \quad (56)$$

According to Formulas (55) and (56), in a case where neither of the phase difference Δθ and the magnetic flux error (ωf0−φf) exists, the second voltage command calculation values vd2* and vq2* are zero, and in a case where the phase difference Δθ or the magnetic flux error (φf0−φf) exists, at least either of the calculation values vd2* and vq2* becomes non-zero.

When Formulas (55) and (56) are rearranged assuming sin Δθ≈Δθ and cos Δθ≈1, Formulas (57) and (58) are obtained:

$$\Delta \theta = -vd2^* + \phi f \quad (57)$$

$$(\phi f0 - \phi f) = -vq2^* \quad (58)$$

From Formula (57), the following facts are revealed as to the phase difference Δθ:

vd2*<0 for (d-axial phase of the rotating orthogonal coordinates)>(phase of the rotor magnetic flux)

vd2*>0 for (d-axial phase of the rotating orthogonal coordinates)<(phase of the rotor magnetic flux)

Accordingly, in a case where the second voltage command calculation value vd2* is plus, the phase difference Δθ comes near to zero when the d-axial phase of the rotating orthogonal coordinates is made large, and in a case where the calculation value vd2* is minus, the phase difference Δθ comes near to zero when the d-axial phase of the rotating orthogonal coordinates is made small.

Likewise, from Formula (58), the following facts are revealed as to the amplitude of the rotor magnetic flux:

vq2*<0 for (φf0)>(φf)

vq2*>0 for (φf0)<(φf)

Accordingly, in a case where the second voltage command calculation value vq2* is plus, the magnetic flux amplitude error (φf0−φf) comes near to zero when the magnetic flux amplitude set value φf0 is made large, and in a case where the command calculation value vq2* is minus, the magnetic flux amplitude error (φf0−φf) comes near to zero when the set value φf0 is made small.

Using the above relations, the constant measurement means 8d adds the phase difference Δθ calculated on the basis of the second voltage commands vd2* and vq2* in conformity with Formulas (59) and (60), to the rotational position θ outputted from a rotational position detector 4, and it outputs the magnetic flux amplitude set value φf0 to the first voltage command calculation means 7b:

$$\Delta \theta = k_\theta \int (vd2^*) dt \quad (59)$$

$$\phi f0 = k_\phi \int (vq2^*) dt \quad (60)$$

where $k_\theta$, $k_\phi$: proportionality constants.

As described above, in the fifth embodiment, the constant measurement means 8d calculates the electrical constants of the AC rotary machine 1b on the basis of the second voltage commands outputted from the second voltage command calculation means 9, while the d-axial component and q-axial component of the current command on the rotating two-axis coordinates (d-q axes) are held at the constant values. Therefore, the fifth embodiment has the advantage that the two sorts of electrical constants such as the phase difference Δθ and magnetic flux amplitude set value φf0 can be measured.

Figure 11:
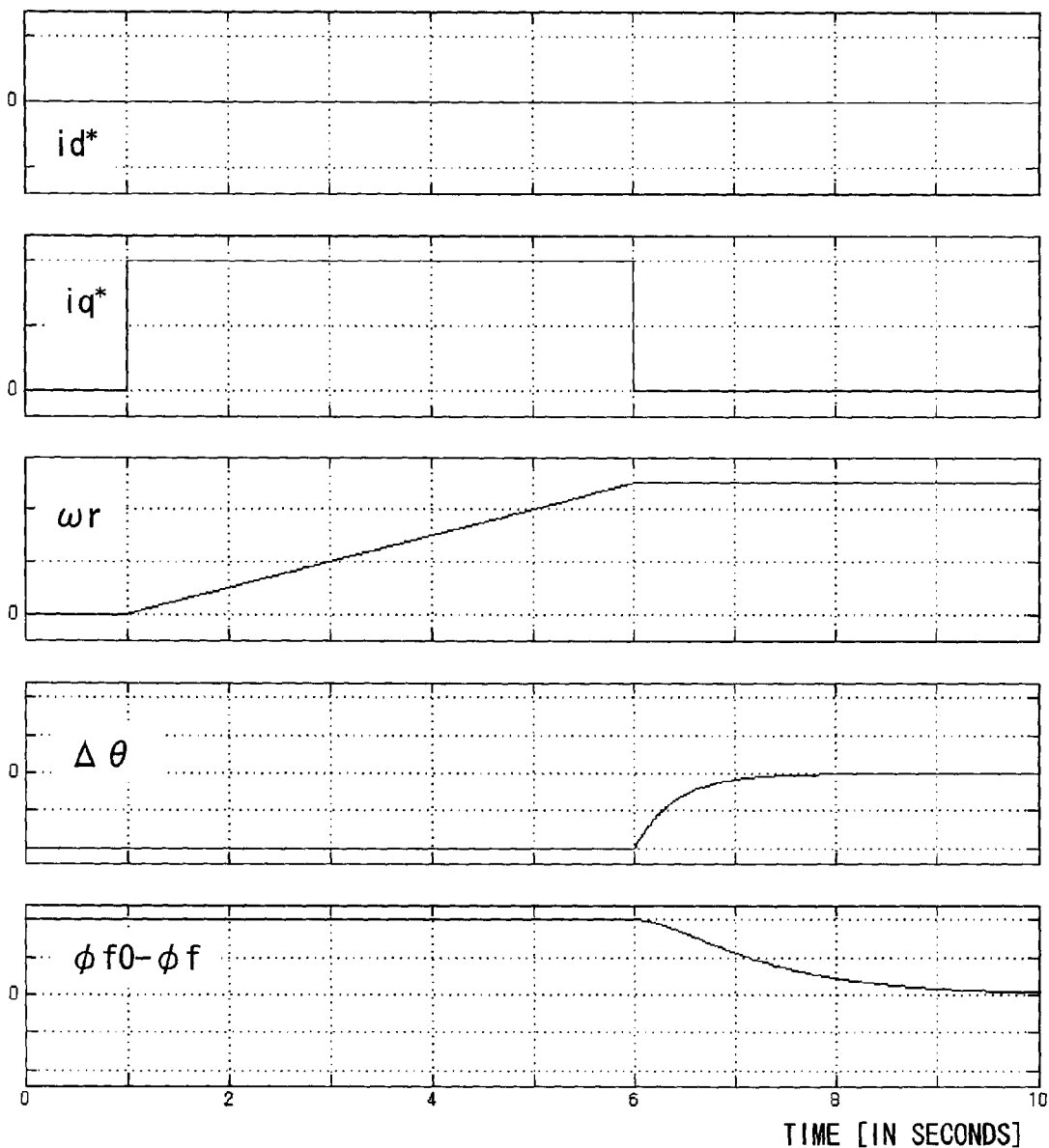
FIG. 11 is a diagram showing examples of operating waveforms in the fifth embodiment of this invention.

Examples of operating waveforms in the fifth embodiment are shown in FIG. 11. Referring to the figure, the first stage of the figure shows the d-axial component id* of the current command, the second stage the q-axial component iq* of the current command, the third stage the angular frequency ωr of the AC rotary machine 1b, the fourth stage the phase difference Δθ, and the fifth stage the magnetic flux amplitude error (φf0−φf).

During a period from a time of 0 second to a time of 1 second, the AC rotary machine 1b is in a stopped state, and the current commands id* and iq* are zero. Since the time of 1 second, the command id* holds zero, while the command iq* holds a plus constant value, and simultaneously, the angular frequency ωr of the AC rotary machine 1b is gradually increased by a generated torque. The constant measurement means 8d is stopped operating until a time of 6 seconds is reached. When the time of 6 seconds has been reached, the commands id* and iq* hold zero, and the constant measurement means 8d calculates the phase difference Δθ and magnetic flux amplitude set value φf0 on the basis of the second voltage commands vd2* and vq2*, whereby the phase difference Δθ and the magnetic flux amplitude error (φf0−φf) converge into zero.

When the condition of id*=iq*=0 is satisfied, a voltage drop ascribable to an armature resistance R or an armature inductance L does not develop, and hence, the set value φf0 and the phase difference Δθ can be obtained even when the resistance R and the inductance L are unknown.

As described above, in the fifth embodiment, the constant measurement means 8d calculates the electrical constants of the AC rotary machine 1b on the basis of the second voltage commands outputted from the second voltage command calculation means 9, while the current commands on the rotating two-axis coordinates (d-q axes) are held zero. Therefore, the fifth embodiment has the advantage that the two sorts of electrical constants such as the phase difference Δθ and the magnetic flux amplitude set value φf0 can be measured.

Sixth Embodiment

The synchronous machine has been handled as the AC rotary machine in each of the foregoing embodiments. A case where an AC rotary machine 1e is an induction machine, will be described in the sixth embodiment of this invention.

Figure 12:
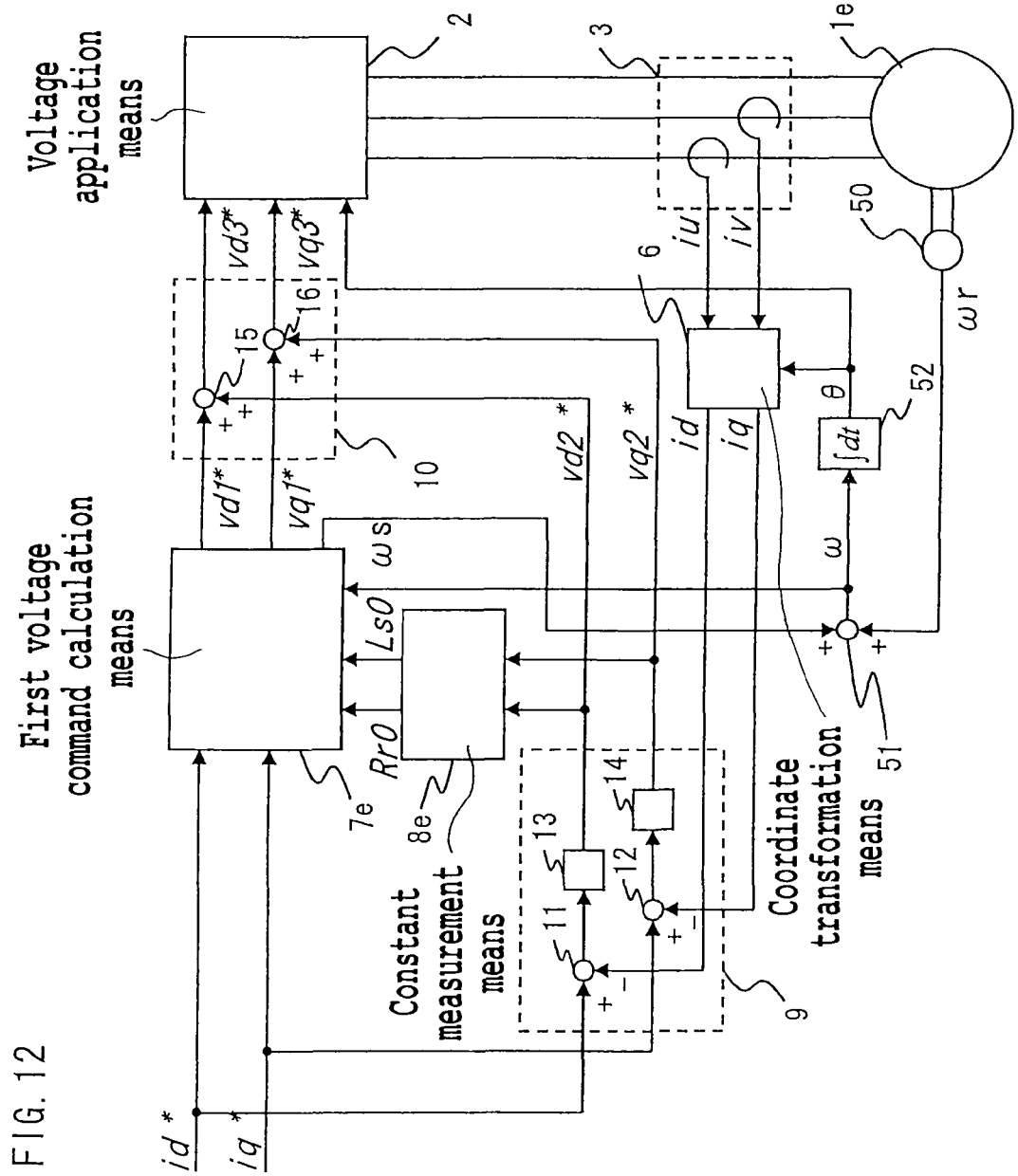
FIG. 12 is a block diagram showing the configuration of a control apparatus for an AC rotary machine according to a sixth embodiment of this invention.

FIG. 12 is a block diagram showing a configuration according to the sixth embodiment of this invention, and the AC rotary machine 1e is the induction machine. By the way, in FIG. 12, parts to which the same numerals and signs as in the foregoing embodiments are assigned are identical or equivalent parts, and the individual descriptions of the overlapping parts shall be omitted.

First voltage command calculation means 7e outputs first voltage commands vd1* and vq1* on rotating two-axis coordinates (d-q axes) and also outputs a slip angular frequency ωs, on the basis of current commands id* and iq* on the rotating two-axis coordinates (d-q axes) and an angular frequency ω.

Constant measurement means Be calculates the armature inductance set value Ls0 of the AC rotary machine 1e and the rotor resistance set value Rr0 of the AC rotary machine 1e, so as to output the set values Ls0 and Rr0 to the first voltage command calculation means 7e.

A velocity detector 50 detects the rotational angular frequency ωr of the AC rotary machine 1e, and an adder 51 adds up the rotational angular frequency ωr and the slip angular frequency ωs so as to output the angular frequency ω. An integrator 52 integrates the angular frequency ω obtained from the adder 51, so as to output a phase θ.

The AC rotary machine 1e is the induction machine, and in a case where the rotating orthogonal coordinates (d-q axes) are rotating at any angular frequency ω, the following formulas hold:

$$vd = Rs \times id - \omega \times \sigma \times Ls \times iq - \omega \times M \div Lr \times \phi qr \quad (61)$$

$$vq = Rs \times iq + \omega \times \sigma \times Ls \times id + \omega \times M \div Lr \times \phi dr \quad (62)$$

$$\phi dr = M \times Rr \times (Rr \times id + \omega s \times Lr \times iq) \div (Rr^2 + \omega s^2 \times Lr^2) \quad (63)$$

$$\phi qr = M \times Rr \times (Rr \times iq - \omega s \times Lr \times id) \div (Rr^2 + \omega s^2 \times Lr^2) \quad (64)$$

where:
Rs: armature resistance of the AC rotary machine 1e,
Rr: rotor resistance of the AC rotary machine 1e,
Ls: armature inductance of the AC rotary machine 1e,
M: mutual inductance of the AC rotary machine 1e,
Lr: rotor inductance of the AC rotary machine 1e,
σ: leakage coefficient of the AC rotary machine 1e,
φdr: d-axial component of the rotor magnetic flux of the AC rotary machine 1e,
φqr: q-axial component of the rotor magnetic flux of the AC rotary machine 1e,
ωs: slip angular frequency of the AC rotary machine 1e.

On the other hand, the first voltage command calculation means 7e generates and outputs first voltage commands vd1* and vq1* on the rotating two-axis coordinates (d-q axes), in conformity with Formulas (65) and (66) on the basis of the current commands id* and iq* on the rotating two-axis coordinates (d-q axes) and the angular frequency ω, and it generates and outputs the slip angular frequency ωs in conformity with Formula (67):

$$vd1^* = Rs0 \times id^* - \omega \times \sigma 0 \times Ls0 \times iq^* \quad (65)$$

$$vq1^* = Rs0 \times iq^* + \omega \times Ls0 \times id^* \quad (66)$$

$$\omega s = Rr0 \times iq^* \div (Lr0 \times id^*) \quad (67)$$

where:
Rs0: armature resistance set value of the AC rotary machine 1e,
Rr0: rotor resistance set value of the AC rotary machine 1e,
Ls0: armature inductance set value of the AC rotary machine 1e,
Lr0: rotor inductance set value of the AC rotary machine 1e,
σ0: leakage coefficient set value of the AC rotary machine 1e.

Here, description will be made concerning a case where the leakage coefficient of the AC rotary machine 1e is known and where the armature inductance and the rotor inductance are equal, that is, a case where σ0=σ holds and where Ls0=Lr0 and Ls=Lr hold.

In the same manner as in the case of the foregoing first embodiment, operations to be stated below can be verified at the point of time at which, under the steady-state operation of the above control system, the absolute values of second voltage command calculation values vd2* and vq2* being the outputs of second voltage command calculation means 9 have entered a predetermined range near zero.

More specifically, in the second voltage command calculation means 9, the d-axial component id* of the current command and the d-axial component id of the current of the AC rotary machine 1e are brought into agreement, and the q-axial component iq* of the current command and the q-axial component iq of the current are brought into agreement. Besides, voltage application means 2 applies voltages to the AC rotary machine 1e on the basis of third voltage commands vd3* and vq3* outputted from third voltage command calculation means 10, so that the d-axial component vd and q-axial component vq of the voltages of the AC rotary machine 1e agree with the third voltage commands vd3* and vq3*, respectively. Considering these relations, Formulas (68) to (73) hold:

$$vd3^* = vd2^* + Rs0 \times id^* - \omega \times \sigma \times Ls0 \times iq^* \quad (68)$$

$$vq3^* = vq2^* + Rs0 \times iq^* + \omega \times Ls0 \times id^* \quad (69)$$

$$id = id^* \quad (70)$$

$$iq = iq^* \quad (71)$$

$$vd=vd3*\tag{72}$$

$$vq=vq3*\tag{73}$$

Here, in a case where Rs0=Rs and Rr0=Rr hold as to the armature resistance and the rotor resistance, approximate solutions concerning the calculational values vd2* and vq2* are evaluated by substituting these relations into Formulas (65) to (73), and Formulas (74) and (75) are obtained:

$$vd2* \approx -\omega \times id*^2 \div (id*^2 + iq*^2) \times (Ls0-Ls) \times iq*\tag{74}$$

$$vq2* \approx -\omega \times id*^2 \div (id*^2 + iq*^2) \times (Ls0-Ls) \times id*\tag{75}$$

According to Formulas (74) and (75), in a case where the armature inductance error (Ls0–Ls) does not exist, the calculational values vd2* and vq2* are zero, and in a case where the armature inductance error exists, the calculational values vd2* and vq2* become non-zero.

On the other hand, in a case where Rs0=Rs and Ls0=Ls hold as to the armature resistance and the armature inductance, approximate solutions concerning the calculational values vd2* and vq2* are evaluated by substituting these relations into Formulas (65) to (73), and Formulas (76) and (77) are obtained:

$$vd2* \approx \omega \times Lr0 \times id* \times iq* \div \{(id*^2+iq*^2) \times Rr0\} \times (Rr0-Rr) \times id*\tag{76}$$

$$vq2* \approx -\omega \times Lr0 \times id* \times iq* \div \{(id*^2+iq*^2) \times Rr0\} \times (Rr0-Rr) \times iq*\tag{77}$$

Considering Formulas (74)-(77), in a case where the armature resistance is known and where the rotor resistance and the armature inductance are unknown, Formulas (78) and (79) of approximate formulas hold concerning the calculational values vd2* and vq2*:

$$vd2* \approx -\omega \times id*^2 \div (id*^2+iq*^2) \times (Ls0-Ls) \times iq* + \omega \times Lr0 \times id* \times iq* \div \{(id*^2+iq*^2) \times Rr0\} \times (Rr0-Rr) \times id*\tag{78}$$

$$vq2* \approx -\omega \times id*^2 \div (id*^2+iq*^2) \times (Ls0-Ls) \times id* - \omega \times Lr0 \times id* \times iq* \div \{(id*^2+iq*^2) \times Rr0\} \times (Rr0-Rr) \times iq*\tag{79}$$

When Formulas (78) and (79) are rearranged assuming Ls0=Lr0, Formulas (80) and (81) are obtained:

$$Ls0-Ls \approx -(vd2* \times iq* + vq2* \times id*) \div (\omega \times id*^2)\tag{80}$$

$$Rr0-Rr \approx (vd2* \times id* - vq2* \times iq*) \times R^{r}0 \div (\omega \times Ls0 \times id* \times iq*)\tag{81}$$

Besides, in the sixth embodiment, let's consider a case where the current commands id* and iq* are given by a plus constant value I1* and where ωr>0 holds. On this occasion, Formulas (80) and (81) become Formulas (82) and (83), respectively:

$$Ls0-Ls \approx -(vd2*+vq2*) \times Ls0 \div (\omega \times Ls0 \times I1*)\tag{82}$$

$$Rr0-Rr \approx (vd2*-vq2*) \times Rr0 \div (\omega \times Ls0 \times I1*)\tag{83}$$

From Formula (82), the following facts are revealed as to the armature inductance:

(vd2*+vq2*)<0 for (Ls0)>(Ls)

(vd2*+vq2*)>0 for (Ls0)<(Ls)

Accordingly, in a case where the sum (vd2*+vq2*) is plus, the armature inductance error (Ls0–Ls) comes near to zero when the armature inductance set value Ls0 is made large, and in a case where the sum (vd2*+vq2*) is minus, the armature inductance error (Ls0–Ls) comes near to zero when the armature inductance set value Ls0 is made small.

Likewise, from Formula (83), the following facts are revealed as to the rotor resistance:

(vd2*-vq2*)>0 for (Rr0)>(Rr)

(vd2*-vq2*)<0 for (Rr0)<(Rr)

Accordingly, in a case where the difference (vd2*-vq2*) is plus, the rotor resistance error (Rr0–Rr) comes near to zero when the set value Rr0 is made small, and in a case where the difference (vd2*-vq2*) is minus, the rotor resistance error (Rr0–Rr) comes near to zero when the set value Rr0 is made large.

Using the above relations, the constant measurement means 8e supplies the first voltage command calculation means 7e with the armature inductance set value Ls0 and rotor resistance set value Rr0 of the AC rotary machine 1e as have been calculated on the basis of the second voltage commands vd2* and vq2* in conformity with Formulas (84) and (85):

$$Ls0 = k_{Ls} \int (vd2*+vq2*)dt\tag{84}$$

$$Rr0 = -k_{Rr} \int (vq2*-vq2*)dt\tag{85}$$

where $k_{Ls}$, $k_{Rr}$: proportionality constants.

Figure 13:
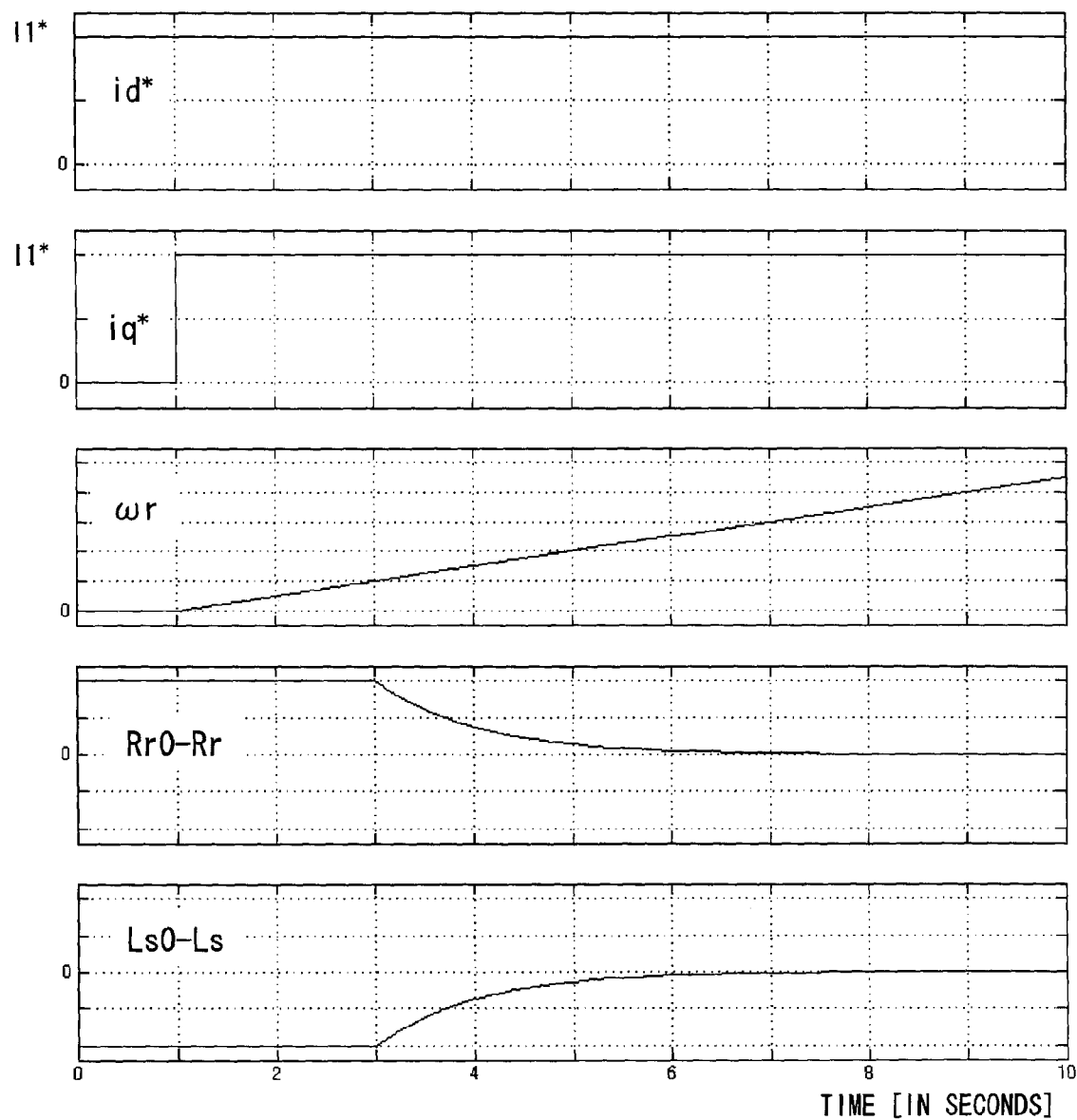
FIG. 13 is a diagram showing examples of operating waveforms in the sixth embodiment of this invention.

Examples of operating waveforms in the sixth embodiment are shown in FIG. 13. Referring to the figure, the first stage of the figure shows the d-axial component id* of the current command, the second stage the q-axial component iq* of the current command, the third stage the rotational angular frequency ωr of the AC rotary machine 1e, the fourth stage the rotor resistance error (Rr0–Rr), and the fifth stage the armature inductance error (Ls0–Ls).

During a period from a time of 0 second to a time of 1 second, the AC rotary machine 1e is in a stopped state, and the current command id* is I1*, while the current command iq* is zero. Since the time of 1 second, the magnitudes of the commands id* and iq* hold the value I1*, and the rotational angular frequency ωr of the AC rotary machine 1e is gradually increased by a generated torque.

The constant measurement means 8e is stopped operating until a time of 3 seconds is reached. When the time of 3 seconds has been reached, the constant measurement means 8e calculates the armature inductance set value Ls0 on the basis of the second voltage commands vd2* and vq2*, whereby the set value Ls0 comes near to the armature inductance Ls, and the inductance error (Ls0–Ls) converges into zero.

Regarding also the rotor resistance, when the time of 3 seconds has been reached, the constant measurement means 8e calculates the rotor resistance set value Rr0 on the basis of the second voltage commands vd2* and vq2*, whereby the set value Rr0 comes near to the rotor resistance Rr, and the resistance error (Rr0–Rr) converges into zero.

Besides, Formulas (84) and (85) obtain the set values of the rotor resistance and armature inductance by integrating the second voltage commands. Therefore, the sixth embodiment prevents the noises of the voltage detection values and current detection values from being directly reflected, and it can solve the problem that the measured constants are influenced by the noises.

Incidentally, the constant measurement means 8e shown in the sixth embodiment has executed the calculation of the armature inductance set value Ls0. Since, however, the AC rotary machine 1e being the induction machine has the relation of Ls≈Lr≈M, the constant measurement means 8e may well calculate the set value of the rotor inductance or the mutual inductance instead of the set value Ls0.

As described above, in the sixth embodiment, the AC rotary machine 1e is the induction machine, the first voltage command calculation means 7e calculates slip angular frequency ωs of the AC rotary machine 1e by using the electrical constants outputted from the constant measurement means 8e, and the adder 51 which outputs the sum between the slip angular frequency ωs and the rotational angular frequency ωr of the AC rotary machine 1e, as any desired angular frequency ω, is included. Therefore, the sixth embodiment has the advantage that, even when the AC rotary machine 1e is the induction machine undergoing a slip, the electrical constants of the AC rotary machine 1e can be obtained.

Besides, the AC rotary machine 1e is the induction machine, and the constant measurement means 8e calculates the mutual inductance value, armature inductance value and rotor resistance value on the basis of the second voltage commands and outputs the calculated values to the first voltage command calculation means 7e. Therefore, the constant measurement means 8e can measure the armature inductance value and rotor resistance value of the induction machine so as to set them as the electrical constants for use in the first voltage command calculation means 7e.

Besides, the constant measurement means 8e calculates the armature inductance value on the basis of the sum between the d-axial component and q-axial component of the second voltage commands outputted from the second voltage command calculation means 9 and outputs the calculated result to the first voltage command calculation means 7e. Therefore, the sixth embodiment has the advantage that the armature inductance value of the AC rotary machine 1e being the induction machine can be measured more precisely so as to set the electrical constant for use in the first voltage command calculation means 7e.

Besides, the constant measurement means 8e calculates the rotor resistance value on the basis of the difference between the d-axial component and q-axial component of the second voltage commands outputted from the second voltage command calculation means 9, so as to output the calculated result to the first voltage command calculation means 7e. Therefore, the sixth embodiment has the advantage that the rotor resistance of the AC rotary machine 1e being the induction machine can be measured precisely so as to set the electrical constant for use in the first voltage command calculation means 7e.

As described above, in the sixth embodiment, the constant measurement means 8e holds the d-axial component and q-axial component of the current commands on the rotating two-axis coordinates (d-q axes), at the predetermined value I1*, and it calculates the electrical constants of the AC rotary machine 1e on the basis of the second voltage commands outputted from the second voltage command calculation means 9. Therefore, the sixth embodiment has the advantage that the two sorts of electrical constants such as the armature inductance and rotor resistance of the induction machine can be measured. More specifically, the constant measurement means 8e calculates the electrical constants of the AC rotary machine 1e on the basis of the second voltage commands outputted from the second voltage command calculation means 9 at the time when the magnitudes of the d-axial component and q-axial component of the current commands on the rotating two-axis coordinates (d-q axes) are equal. Therefore, the sixth embodiment has the advantage that the electrical constants of the AC rotary machine, such as the armature inductance and rotor resistance, can be measured so as to set the electrical constants for use in the first voltage command calculation means 7e.

Seventh Embodiment

In the foregoing sixth embodiment, the constant measurement means 8e has calculated the armature inductance set value Ls0 and rotor inductance set value Rr0 of the AC rotary machine 1e on the basis of the second voltage commands vd2* and vq2*, in conformity with Formulas (84) and (85). In this regard, the armature inductance set value Ls0 and the rotor resistance set value Rr0 may well be calculated on the basis of the second voltage commands vd2* and vq2*, the current commands id* and iq*, and the angular frequency ω.

Figure 14:
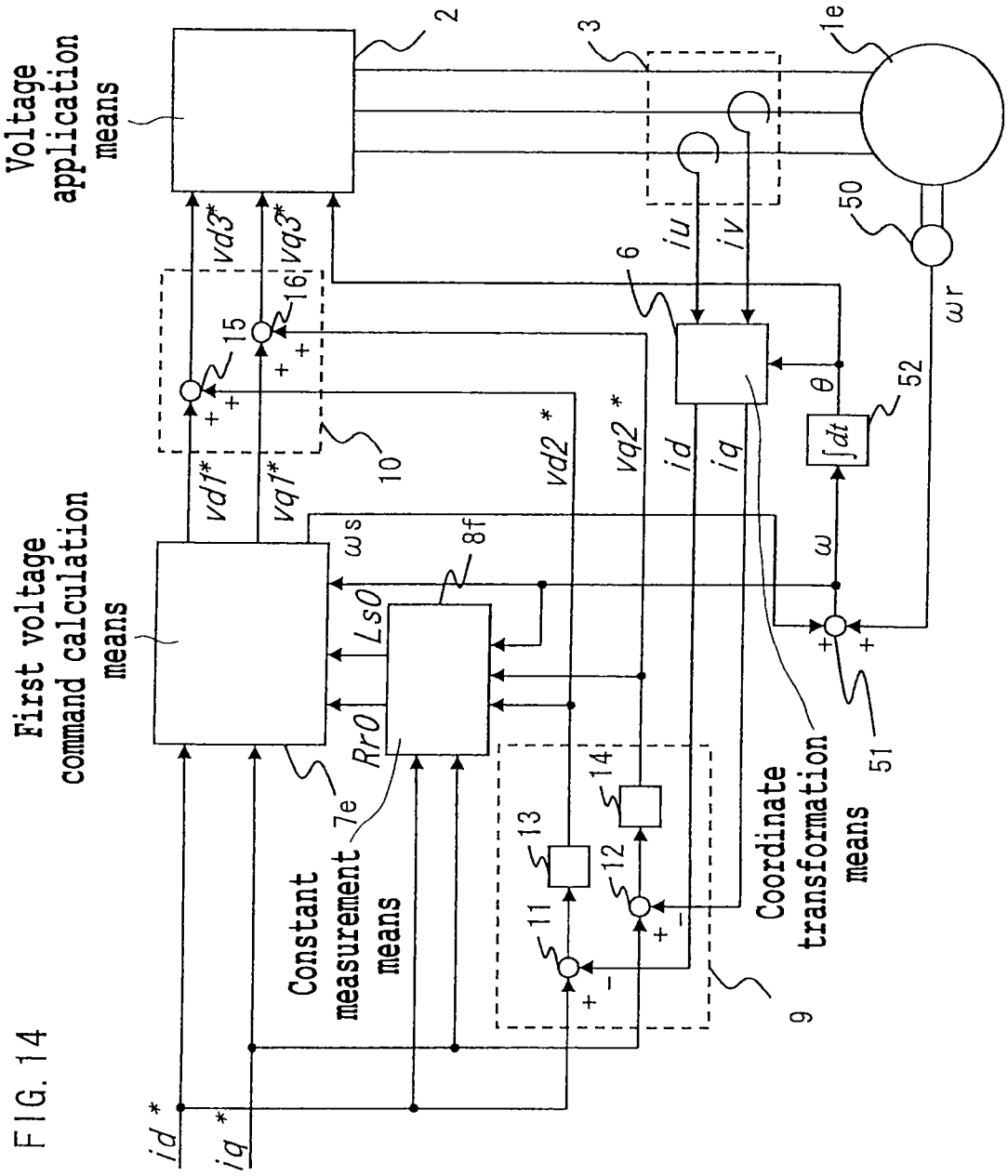
FIG. 14 is a block diagram showing the configuration of a control apparatus for an AC rotary machine according to a seventh embodiment of this invention.

FIG. 14 is a block diagram showing a configuration according to the seventh embodiment of this invention. Constant measurement means 8f calculates the armature inductance set value Ls0 and the rotor resistance set value Rr0 on the basis of the second voltage commands vd2* and vq2*, current commands id* and iq*, and angular frequency ω, so as to output the calculated values Ls0 and Rr0 to first voltage command calculation means 7e. By the way, in FIG. 14, parts to which the same numerals and signs as in FIG. 1 are assigned are identical or equivalent parts, and the individual descriptions of the overlapping parts shall be omitted.

Formulas (80) and (81) will be respectively listed as Formulas (86) and (87) again:

$$Ls0-Ls \approx -(vd2^* \times iq^* + vq2^* \times id^*) \div (\omega \times id^{*2}) \quad (86)$$

$$Rr0-Rr \approx (vd2^* \times id^* - vq2^* \times iq^*) \times Rr0 \div (\omega \times^{Ls}0 \times id^* \times iq^*) \quad (87)$$

The right-hand side of Formula (86) is proportional to the magnitude of "−(vd2*×iq*+vq2*×id*)" and is inversely proportional to the magnitude of "id*2", and it is inversely proportional to the magnitude of "ω".

Besides, the right-hand side of Formula (87) is proportional to the magnitude of "(vd2*×id*−vq2*×iq*)" and is inversely proportional to the magnitude of "(id*×iq*)", and it is inversely proportional to the magnitude of "ω".

Considering these facts, the constant measurement means 8f shown in the seventh embodiment supplies the first voltage command calculation means 7e with the armature inductance set value Ls0 and rotor resistance set value Rr0 of an AC rotary machine 1e, on the basis of Formulas (88) and (89):

$$Ls0 = k_{Ls} \int \{(vd2^* \times iq^* + vq2^* \times id^*) \div (\omega \times id^{*2})\} dt \quad (88)$$

$$Rr0 = -k_{Rr} \int \{(vd2^* \times id^* - vq2^* \times iq^*) \div (\omega \times id^* \times iq^*)\} dt \quad (89)$$

where $k_{Ls}$, $k_{Rr}$: proportionality constants.

The foregoing sixth embodiment has accompanied the restriction that the current commands id* and iq* are the plus constant values, and that also the angular frequency ω is plus. In contrast, in the seventh embodiment, the constant measurement means 8f uses Formulas (88) and (89) and can therefore calculate the exact armature inductance set value Ls0 and rotor resistance set value Rr0 irrespective of the sign and magnitude of the component iq* and those of the angular frequency ω.

Figure 15:
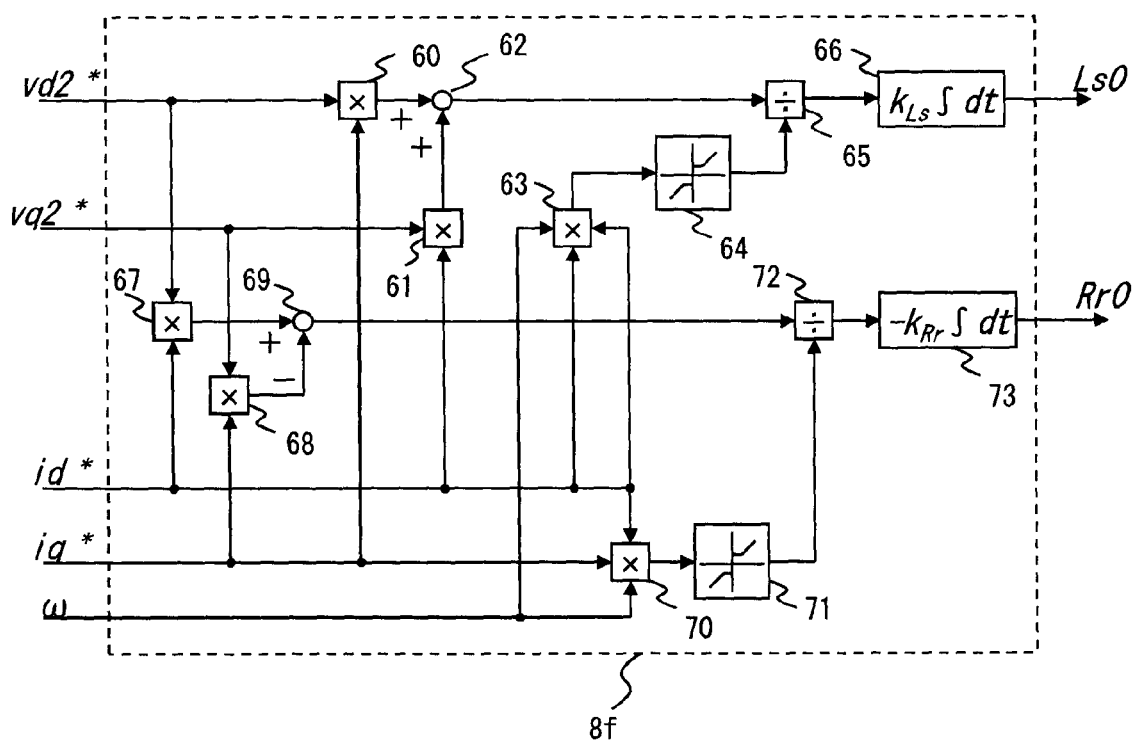
FIG. 15 is a diagram showing the internal configuration of constant measurement means 8f in FIG. 14.

FIG. 15 is a diagram showing the internal configuration of the constant measurement means 8f in the seventh embodiment. Referring to the figure, a multiplier 60 calculates the product between the d-axial component vd2* of the second voltage command and the q-axial component iq* of the current command, and a multiplier 61 calculates the product between the q-axial component vq2* of the second voltage command and the d-axial component id* of the current command. An adder 62 adds up the output of the multiplier 60 and that of the multiplier 61. A multiplier 63 calculates the product between the square of the d-axial component id* of the current command and the angular frequency ω, and it outputs the calculated product to a limiter 64. The limiter 64 executes a limit operation so as to generate, at least, a plus predetermined value in a case where the output of the multiplier 63 is plus, and it executes a limit operation so as to generate, at most, a minus predetermined value in a case where the output of the multiplier 63 is minus, whereby a divider 65 is prevented from executing a division by zero. The divider 65 divides the output of the adder 62 by the output of the limiter 64. An integrator 66 integrates the quotient of the divider 65 and then multiplies the resulting integral value by "$k_{Ls}$", and it outputs the resulting product as the armature inductance set value Ls0. The calculation of Formula (88) can be executed by the series of calculations based on the multiplier 60, multiplier 61, adder 62, multiplier 63, limiter 64, divider 65 and integrator 66.

Likewise, a multiplier 67 calculates the product between the d-axial component vd2* of the second voltage command and the d-axial component id* of the current command, and a multiplier 68 calculates the product between the q-axial component vq2* of the second voltage command and the q-axial component iq* of the current command. A subtracter 69 subtracts the output of the multiplier 68 from that of the multiplier 67. A multiplier 70 calculates the product between the current commands id* and iq* and the angular frequency ω, and it outputs the calculated product to a limiter 71. The limiter 71 executes a limit operation so as to generate, at least, a plus predetermined value in a case where the output of the multiplier 70 is plus, and it executes a limit operation so as to generate, at most, a minus predetermined value in a case where the output of the multiplier 70 is minus, whereby a divider 72 is prevented from executing a division by zero. The divider 72 divides the output of the subtracter 69 by the output of the limiter 71. An integrator 73 integrates the quotient of the divider 72 and then multiplies the resulting integral value by "$-k_{Rr}$", and it outputs the resulting product as the rotor resistance set value Rr0. The calculation of Formula (89) can be executed by the series of calculations based on the multiplier 67, multiplier 68, subtracter 69, multiplier 70, limiter 71, divider 72 and integrator 73.

As described above, in the seventh embodiment, the constant measurement means 8f calculates the rotor resistance set value Rr0 and the armature inductance set value Ls0 on the basis of the second voltage commands vd2* and vq2*, the current commands id* and iq* and the angular frequency ω. Therefore, the seventh embodiment has the advantage that the exact rotor resistance set value and armature inductance set value are obtained irrespective of the signs and magnitudes of the current commands id* and iq* and the angular frequency ω.

Eighth Embodiment

In the foregoing seventh embodiment, the d-axial component id* of the current command has been given as the predetermined value. In this regard, the d-axial component id* may well be adjusted so as to generate the maximum voltage amplitude which the voltage application means 2 can output when the angular frequency ω is a reference angular frequency $\omega_{BASE}$ (the maximum angular frequency at which a voltage saturation does not occur).

If the voltage amplitude of the AC rotary machine 1e can be enlarged, a current amplitude can be made smaller for an identical output, and a high efficiency control based on decrease in a loss such as copper loss is permitted. However, when it is intended to perform a control to a voltage amplitude which the voltage application means 2 cannot output, the voltage saturation occurs, and a desired control characteristic cannot be attained. Therefore, the current command id* is adjusted so as to generate the maximum voltage amplitude which can be outputted by the voltage application means 2 when the angular frequency is the reference angular frequency $\omega_{BASE}$, whereby the voltage amplitude is enlarged within a range in which the voltage saturation does not occur, as long as the angular frequency ω is at most the reference angular frequency $\omega_{BASE}$.

From the above viewpoint, the eighth embodiment grasps the concept of the electrical constant to be wider. The d-axial component id* of the current command is handled as the electrical constant, and magnetic flux adjustment means 80 for evaluating the current command id* is disposed anew.

Figure 16:
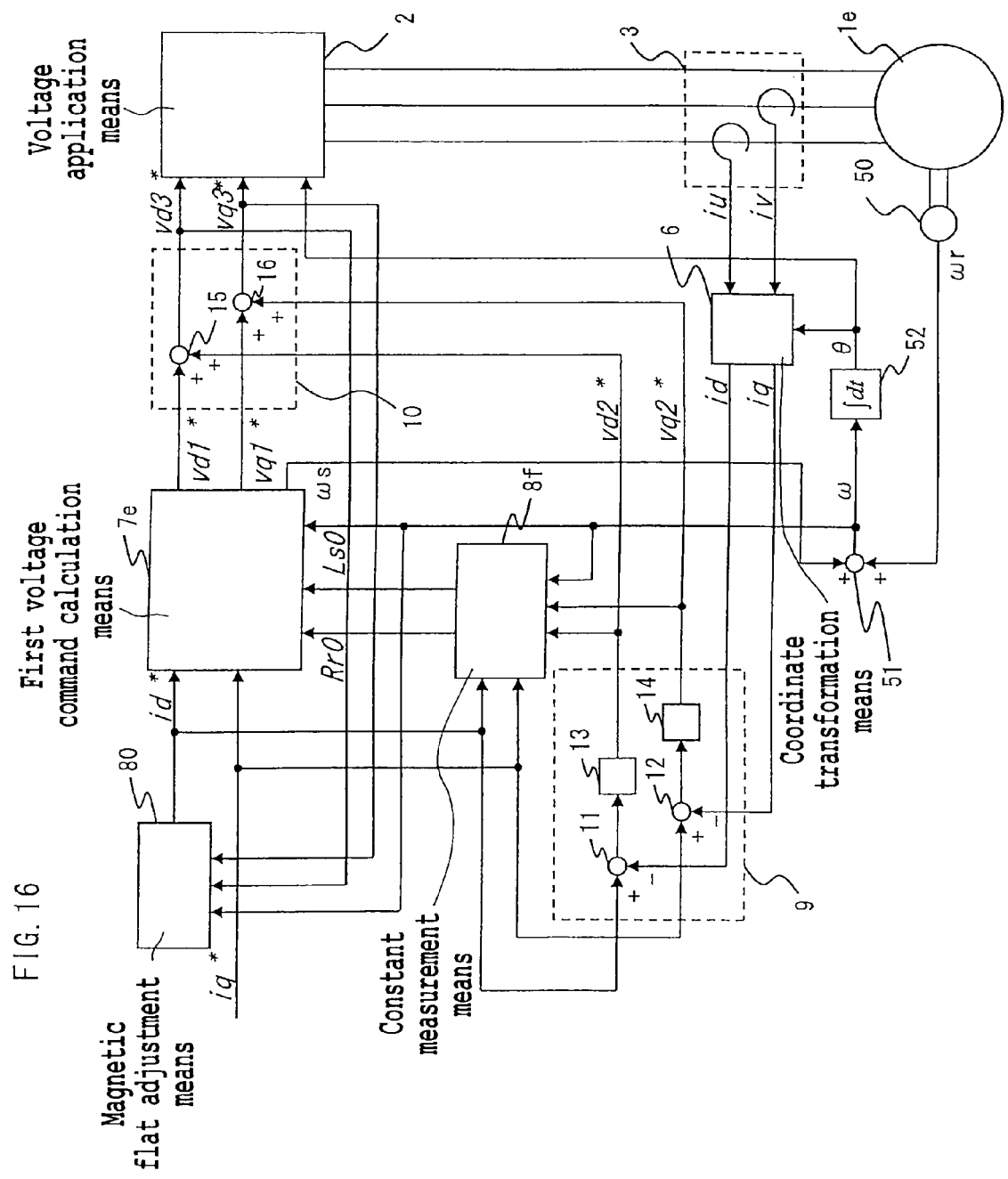
FIG. 16 is a block diagram showing the configuration of a control apparatus for an AC rotary machine according to an eighth embodiment of this invention.

FIG. 16 is a block diagram showing a configuration according to the eighth embodiment of this invention. The magnetic flux adjustment means 80 generates and outputs the d-axial component id* of the current command on the basis of third voltage commands vd3* and vq3* inputted to the voltage application means 2, and the angular frequency ω. As has been known in the art, the magnetic flux amplitude of the AC rotary machine 1e is proportional to the d-axial component id* of the current command, and hence, the adjustment of the current command id* signifies the adjustment of the magnetic flux of the AC rotary machine 1e. By the way, in FIG. 16, parts to which the same numerals and signs as in FIG. 14 are assigned are identical or equivalent parts, and the individual descriptions of the overlapping parts shall be omitted.

Before the description of the operation of the magnetic flux adjustment means 80, there will be described the relationship between the voltage amplitude of the AC rotary machine 1e, namely, the amplitude of the third voltage commands inputted to the voltage application means 2, and the d-axial component id* of the current command.

Figure 17:
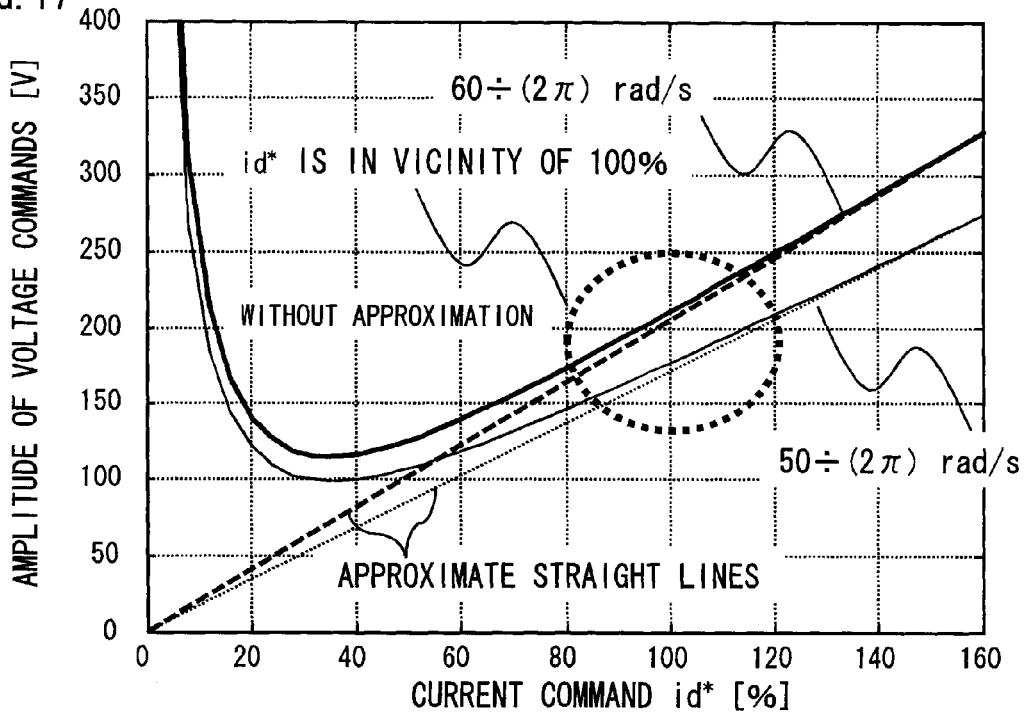
FIG. 17 is a diagram showing the relationship between a current command id* and the amplitude of voltage commands in the eighth embodiment of this invention.

FIG. 17 is a diagram showing the relationships between the current command id* and the amplitude of the voltage commands at angular frequencies of 50÷2π[rad/s] and 60÷2π[rad/s]. The amplitude of the voltage commands is defined by Formula (90):

$$\text{(Amplitude of the voltage commands)} = \sqrt{(vd3^{*2} + vq3^{*2})} \quad (90)$$

As seen from FIG. 17, when the d-axial component id* of the current command is made larger than 100%, the amplitude of the voltage commands becomes large, and simultaneously, even when the d-axial component id* is made smaller than 20%, the amplitude of the voltage commands becomes large, so that the d-axial component id* and the amplitude of the voltage commands are not in a proportional relation. However, when the d-axial component id* is limited within a range vicinal to 100%, it may well be deemed that, as indicated by approximate straight lines in FIG. 17, the d-axial component id* and the amplitude of the voltage commands are in the proportional relation.

Figure 18:
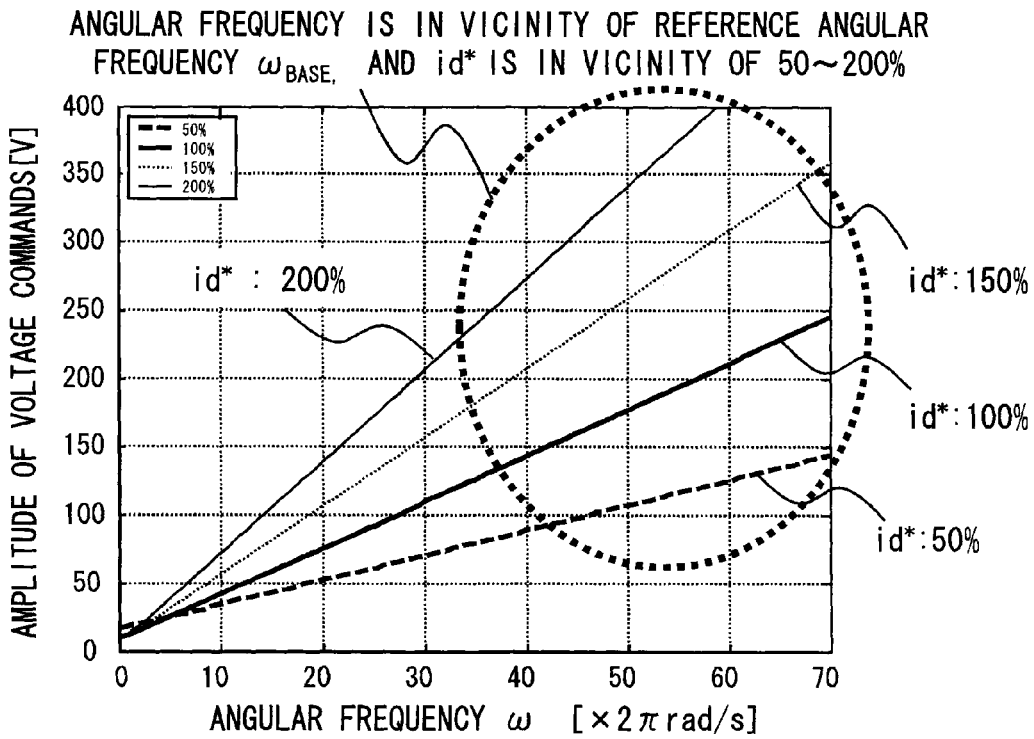
FIG. 18 is a diagram showing the relationship between an angular frequency ω and the amplitude of the voltage commands in the eighth embodiment of this invention.

FIG. 18 is a diagram showing the relationship between the angular frequency ω and the amplitude of the voltage commands. Within a range in which the d-axial component id* is 50-200%, it may well be said that the relationship between the angular frequency ω and the amplitude of the voltage commands is approximately a proportional relation. Especially in the case where the reference angular frequency $\omega_{BASE}$ is set at 60×2π[rad/s], it may well be said that the angular frequency ω and the amplitude of the voltage commands are in a proportional relation and that the d-axial component id* and the amplitude of the voltage commands are also in a proportional relation, on conditions that the d-axial component id* of the current command is 50-200% and that the angular frequency ω is in the vicinity of the reference angular frequency $\omega_{BASE}$. In other words, the following relation holds:

$$\text{(Amplitude of the voltage commands)} \propto (\omega \times id^*)$$

where the d-axial component id* of the current command is in the vicinity of 100%, and the angular frequency ω is in the vicinity of the reference angular frequency $\omega_{BASE}$.

Considering the above relations, the magnetic flux adjustment means 80 adjusts the d-axial component id* so as to generate the maximum voltage amplitude which the voltage application means 2 can output when the angular frequency ω) is the reference angular frequency $\omega_{BASE}$, on the basis of the third voltage commands vd3* and vq3* inputted to the voltage application means 2, and the angular frequency ω.

Figure 19:
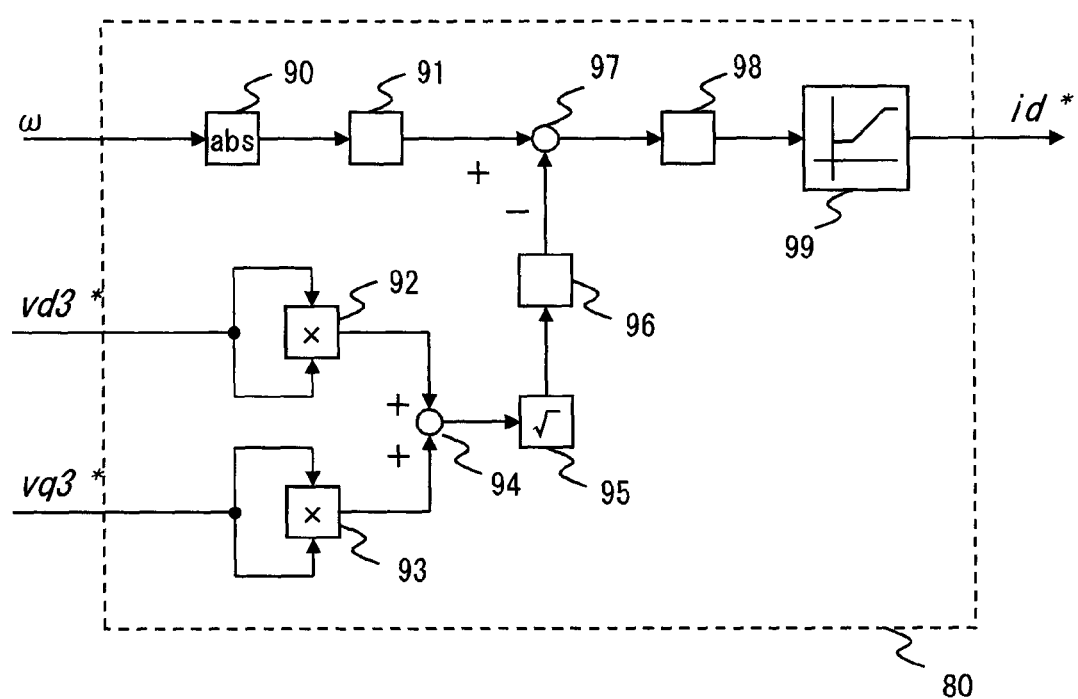
FIG. 19 is a diagram showing the internal configuration of magnetic flux adjustment means 80 in FIG. 16.

FIG. 19 is a diagram showing the internal configuration of the magnetic flux adjustment means 80 in this embodiment. Referring to the figure, an absolute value calculator 90 calculates the absolute value of the angular frequency ω, and a gain calculator 91 multiplies the output of the absolute value calculator 90 by $1/\omega_{BASE}$. A multiplier 92 calculates the square of the d-axial component vd3* of the third voltage command, and a multiplier 93 calculates the square of the q-axial component vq3* of the third voltage command.

An adder 94 executes the addition calculation between the output of the multiplier 92 and that of the multiplier 93, a root calculator 95 calculates the root of the output of the adder 94, and a gain calculator 96 multiplies the output of the root calculator 95 by $1/V_{BASE}$. Here, "$V_{BASE}$" denotes the maximum voltage amplitude which the voltage application means 2 can output.

A subtracter 97 subtracts the output of the gain calculator 96 from that of the gain calculator 91, and an amplifier 98 amplifies the output of the subtracter 97 by an integration or a proportional integration. Owing to the proportional integration, the "$1/\omega_{BASE}$ times the output of the absolute value calculator 90" and the "$1/V_{BASE}$ times the output of the root calculator 95" can be brought into agreement. As a result, it is possible to output the d-axial component id* of the current command with which the amplitude of the voltage commands becomes the amplitude $V_{BASE}$ when the angular frequency ω is the reference angular frequency $\omega_{BASE}$. A limiter 99 limits an upper limit and a lower limit so that the output of the amplifier 98 may become 50-200% of the current command id*.

When the magnetic flux adjustment means 80 functioning as constant measurement means is configured as shown in FIG. 19, it is permitted to output the d-axial component id* of the current command with which the amplitude of the voltage commands becomes the amplitude $V_{BASE}$ when the angular frequency ω is the reference angular frequency $\omega_{BASE}$.

Figure 20:
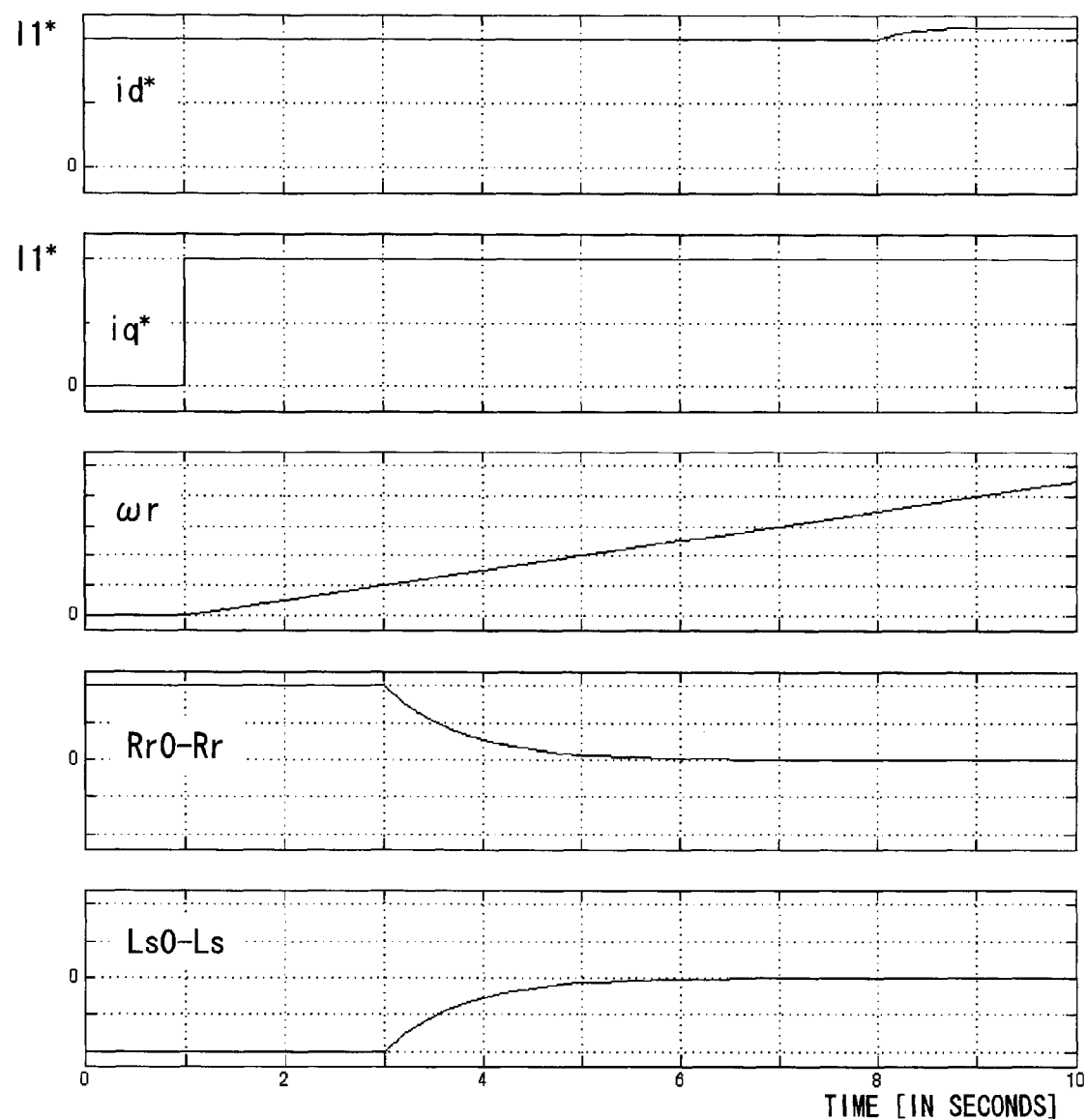
FIG. 20 is a diagram showing examples of operating waveforms in the eighth embodiment of this invention.

Examples of operating waveforms in the eighth embodiment are shown in FIG. 20. Referring to the figure, the first stage of the figure shows the d-axial component id* of the current command, the second stage the q-axial component iq* of the current command, the third stage the rotational angular frequency ωr of the AC rotary machine 1e, the fourth stage the rotor resistance error (Rr0–Rr), and the fifth stage the armature inductance error (Ls0–Ls).

During a period from a time of 0 second to a time of 1 second, the AC rotary machine 1e is in a stopped state, and the current command id* is I1*, while the current command iq* is zero. Since the time of 1 second, the magnitudes of the commands id* and iq* hold the value I1*, and the rotational angular frequency ωr of the AC rotary machine 1e is gradually increased by a generated torque. The constant measurement means 8f is stopped operating until a time of 3 seconds is reached. When the time of 3 seconds has been reached, the constant measurement means 8f calculates the armature inductance set value Ls0 on the basis of the second voltage commands vd2* and vq2*, whereby the set value Ls0 comes near to the armature inductance Ls, and the inductance error (Ls0–Ls) converges into zero.

Regarding also the rotor resistance, when the time of 3 seconds has been reached, the constant measurement means 8f calculates the rotor resistance set value Rr0 on the basis of the second voltage commands vd2* and vq2*, whereby the set value Rr0 comes near to the rotor resistance Rr, and the rotor resistance error (Rr0–Rr) converges into zero.

The magnetic flux adjustment means 80 stop operating before a time of 8 seconds is reached. The d-axial component id* of the current command held at the value I1* is in the vicinity of 100%, and the angular frequency ω becomes vicinal to the reference angular frequency $\omega_{BASE}$ when the time of 8 seconds has been reached. Therefore, the magnetic flux adjustment means 80 starts operating at the time of 8 seconds, and the current command id* can be adjusted so as to generate the maximum voltage amplitude $V_{BASE}$ which the voltage application means 2 can output when the angular frequency ω is the reference angular frequency $\omega_{BASE}$.

As described above, in the eighth embodiment, the magnetic flux adjustment means 80 adjusts the magnetic flux of the AC rotary machine 1e by adjusting the d-axial component id* of the current command so that the constant times the amplitude of the voltage commands may agree with the constant times the angular frequency ω in the vicinity of a predetermined velocity. Therefore, the current command id* is obtained so as to generate the maximum voltage amplitude which the voltage application means 2 can output at the time of the reference angular frequency $\omega_{BASE}$, and the voltage amplitude can be enlarged within the range in which the voltage saturation does not occur, when the angular frequency ω is, at most, the reference angular frequency $\omega_{BASE}$. Accordingly, the eighth embodiment has the advantage that the AC rotary machine 1e can be controlled stably and efficiently.

Besides, in each modified embodiment of this invention, the constant measurement means calculates the constant set values on the basis of the second voltage commands from the second voltage command calculation means, the current commands and the angular frequency. Therefore, conditions for calculating the constant set values are relaxed, and the convergibilities of the calculations for obtaining the constant set values are enhanced.

Besides, the AC rotary machine is the synchronous machine, and the constant measurement means calculates the armature resistance set value as the constant set value, on the basis of the q-axial component of the second voltage command. Therefore, the armature resistance of the synchronous machine being the AC rotary machine can be evaluated easily and precisely.

The AC rotary machine is the synchronous machine, and the constant measurement means calculates the armature inductance set value as the constant set value, on the basis of the d-axial component of the second voltage command. Therefore, the armature inductance of the synchronous machine being the AC rotary machine can be evaluated easily and precisely.

Besides, the AC rotary machine is the synchronous machine, and the constant measurement means calculates the armature resistance set value as the constant set value, on the basis of the q-axial component of the second voltage command and the q-axial component of the current command. Therefore, the armature resistance of the synchronous machine being the AC rotary machine can be evaluated easily and precisely.

Besides, the AC rotary machine is the synchronous machine, and the constant measurement means calculates the armature inductance set value as the constant set value, on the basis of the d-axial component of the second voltage command, the q-axial component of the current command and the angular frequency. Therefore, the armature inductance of the synchronous machine being the AC rotary machine can be evaluated easily and precisely.

Besides, the AC rotary machine is the synchronous machine having the saliency, and the constant measurement means calculates the d-axial component set value of the armature inductance as the constant set value, on the basis of the q-axial component of the second voltage command. Therefore, the d-axial component of the armature inductance of the synchronous machine having the saliency as is the AC rotary machine can be evaluated easily and precisely.

Besides, the AC rotary machine is the synchronous machine having the saliency, and the constant measurement means calculates the q-axial component set value of the armature inductance as the constant set value, on the basis of the d-axial component of the second voltage command. Therefore, the q-axial component of the armature inductance of the synchronous machine having the saliency as is the AC rotary machine can be evaluated easily and precisely.

Besides, the AC rotary machine is the synchronous machine having the saliency, and the constant measurement means calculates the d-axial component set value of the armature inductance as the constant set value, on the basis of the q-axial component of the second voltage command, the d-axial component of the current command and the angular frequency. Therefore, the d-axial component of the armature inductance of the synchronous machine having the saliency as is the AC rotary machine can be evaluated easily, quickly and precisely.

Besides, the AC rotary machine is the synchronous machine having the saliency, and the constant measurement means calculates the q-axial component set value of the armature inductance as the constant set value, on the basis of the d-axial component of the second voltage command, the q-axial component of the current command and the angular frequency. Therefore, the q-axial component of the armature inductance of the synchronous machine having the saliency as is the AC rotary machine can be evaluated easily, quickly and precisely.

Besides, the AC rotary machine is the synchronous machine, and the constant measurement means calculates the phase difference between the d-axis of d-q axes and the rotor magnetic flux of the AC rotary machine, on the basis of the d-axial component of the second voltage command, and it further calculates the angular frequency set value of the AC rotary machine as the constant set value, on the basis of the phase difference and the rotational position detection value of the AC rotary machine. Therefore, the angular frequency of the synchronous machine being the AC rotary machine can be evaluated easily and precisely.

Besides, the AC rotary machine is the synchronous machine, and the constant measurement means calculates the magnetic flux amplitude set value of the AC rotary machine as the constant set value, on the basis of the q-axial component of the second voltage command. Therefore, the magnetic flux amplitude of the synchronous machine being the AC rotary machine can be evaluated easily and precisely.

Besides, the AC rotary machine is the induction machine, the first voltage command calculation means calculates the slip angular frequency of the AC rotary machine on the basis of the current commands on d-q axes and the electrical constants, and the adder which calculates the angular frequency of the AC rotary machine from the slip angular frequency and the angular frequency detection value of the AC rotary machine is disposed. Therefore, the angular frequency of the induction motor being the AC rotary machine can be evaluated easily and precisely.

Besides, the constant measurement means calculates any of the armature inductance set value, the rotor inductance set value and the mutual inductance set value as the constant set value, on the basis of the sum between the d-axial component and q-axial component of the second voltage commands. Therefore, the armature inductance, rotor inductance or mutual inductance of the induction machine being the AC rotary machine can be evaluated easily and precisely.

Besides, the constant measurement means calculates the rotor resistance set value as the constant set value, on the basis of the difference between the d-axial component and q-axial component of the second voltage commands. Therefore, the rotor resistance of the induction machine being the AC rotary machine can be evaluated easily and precisely.

Besides, the constant measurement means calculates the constant set value on the basis of the second voltage commands from the second voltage command calculation means, the current commands and the angular frequency. Therefore, conditions for calculating the constant set values are relaxed, and the convergibilities of the calculations for obtaining the constant set values are enhanced.

Besides, the constant measurement means calculates the constant set values, only in a case where the angular frequency falls within a range of, at least, predetermined value, and it stops the calculations of the constant set values within a range in which the angular frequency is less than the predetermined value. It is therefore possible to prevent the degradation of a control performance ascribable to the errors of the constants.

Besides, letting "$C\omega_{BASE}$" denote the maximum angular frequency at which the voltage saturation does not occur, and "$V_{BASE}$" denote the maximum voltage amplitude which the voltage application means can output, the magnetic flux adjustment means is disposed for calculating the d-axial component of the current command so that:

(Angular frequency of the AC rotary machine)/$\omega_{BASE}$= (Amplitude of the third voltage commands)/$V_{BASE}$ may hold, on the basis of the third voltage commands and the angular frequency. Therefore, the voltage amplitude can be enlarged within the range in which the voltage saturation does not occur. It is accordingly possible to control the AC rotary machine stably and efficiently.

Various modifications and alterations of this invention will be apparent to those skilled in the art without departing from the scope and spirit of this invention, and it should be understood that this invention is not limited to the illustrative embodiments set forth herein.

What is claimed is:

1. A control apparatus for an AC rotary machine, wherein the AC rotary machine is driven on a basis of current commands on rotating two-axis coordinates which rotate at an angular frequency of the AC rotary machine, the control apparatus comprising:

current detection means for detecting currents of the AC rotary machine;

coordinate transformation means for transforming current detection values from said current detection means, into current detection values on the rotating two-axis coordinates;

first voltage command calculation means for calculating first voltage commands on the rotating two-axis coordinates, from relational formulas among the current commands on the rotating two-axis coordinates, the angular frequency and a plurality of electrical constants of the AC rotary machine;

second voltage command calculation means for calculating second voltage commands on the rotating two-axis coordinates, on a basis of difference currents between the current commands on the rotating two-axis coordinates and the current detection values on the rotating two-axis coordinates, so that the difference currents may converge into zero;

third voltage command calculation means for calculating third voltage commands on the rotating two-axis coordinates, by adding the first voltage commands on the rotating two-axis coordinates and the second voltage commands on the rotating two-axis coordinates;

voltage application means for applying voltages to the AC rotary machine on a basis of the third voltage commands on the rotating two-axis coordinates, wherein said first voltage command calculation means sets at least one of the plurality of electrical constants with a constant set value inputted from outside; and constant measurement means for calculating the constant set value on a basis of the second voltage commands from said second voltage command calculation means.

2. The control apparatus for an AC rotary machine as defined in claim 1, wherein said constant measurement means calculates the constant set value on the basis of the second voltage commands from said second voltage command calculation means, the current commands and the angular frequency.

3. The control apparatus for an AC rotary machine as defined in claim 1, wherein
the AC rotary machine is a synchronous machine, and
said constant measurement means calculates an armature resistance set value as the constant set value, on a basis of a component of the second voltage command.

4. The control apparatus for an AC rotary machine as defined in claim 1, wherein
the AC rotary machine is a synchronous machine, and
said constant measurement means calculates an armature inductance set value as the constant set value, on a basis of a component of the second voltage command.

5. The control apparatus for an AC rotary machine as defined in claim 2, wherein
the AC rotary machine is a synchronous machine, and
said constant measurement means calculates an armature resistance set value as the constant set value, on a basis of a component of the second voltage command and a component of the current command.

6. The control apparatus for an AC rotary machine as defined in claim 2, wherein
the AC rotary machine is a synchronous machine, and
said constant measurement means calculates an armature inductance set value as the constant set value, on a basis of a component of the second voltage command, a component of the current command, and the angular frequency.

7. The control apparatus for an AC rotary machine as defined in claim 1, wherein
the AC rotary machine is a synchronous machine having a saliency, and
said constant measurement means calculates a component set value of an armature inductance as the constant set value, on a basis of a component of the second voltage command.

8. The control apparatus for an AC rotary machine as defined in claim 1, wherein
said constant measurement means calculates a component set value of an armature inductance as the constant set value, on a basis of a component of the second voltage command.

9. The control apparatus for an AC rotary machine as defined in claim 2, wherein
the AC rotary machine is a synchronous machine having a saliency, and
said constant measurement means calculates a component set value of an armature inductance as the constant set value, on a basis of a component of the second voltage command, a component of the current command, and the angular frequency.

10. The control apparatus for an AC rotary machine as defined in claim 2, wherein
said constant measurement means calculates a component set value of an armature inductance as the constant set value, on a basis of a component of the second voltage command, a component of the current command, and the angular frequency.

11. The control apparatus for an AC rotary machine as defined in claim 1, wherein
the AC rotary machine is a synchronous machine, and
said constant measurement means calculates a phase difference between an axis of the rotating two-axis coordinates and a rotor magnetic flux of the AC rotary machine, on a basis of a component of the second voltage command, and further calculates an angular frequency set value of the AC rotary machine as the constant set value, on a basis of the phase difference and a rotational position detection value of the AC rotary machine.

12. The control apparatus for an AC rotary machine as defined in claim 1, wherein
the AC rotary machine is a synchronous machine, and
said constant measurement means calculates a magnetic flux amplitude set value of the AC rotary machine as the constant set value, on a basis of a component of the second voltage command.

13. The control apparatus for an AC rotary machine as defined in claim 1, wherein
the AC rotary machine is an induction machine,
said first voltage command calculation means calculates a slip angular frequency of the AC rotary machine, on a basis of the current commands on the rotating two-axis coordinates and the electrical constant, and the control apparatus further comprises:
an adder which calculates an angular frequency of the AC rotary machine from the slip angular frequency and an angular frequency detection value of the AC rotary machine is disposed.

14. The control apparatus for an AC rotary machine as defined in claim 13, wherein said constant measurement means calculates any of an armature inductance set value, a rotor inductance set value and a mutual inductance set value as the constant set value, on a basis of a sum between a first axial component and a second axial component of the second voltage commands.

15. The control apparatus for an AC rotary machine as defined in claim 13, wherein said constant measurement means calculates a rotor resistance set value as the constant set value, on a basis of a difference between a first axial component and a second axial component of the second voltage commands.

16. The control apparatus for an AC rotary machine as defined in claim 13, wherein said constant measurement means calculates the constant set value on a basis of the second voltage commands from said second voltage command calculation means, the current commands, and the angular frequency.

17. The control apparatus for an AC rotary machine as defined in claim 1, wherein said constant measurement means calculates the constant set value, only in a case where the angular frequency falls within a range of a predetermined value or more, and the constant measurement means stops the calculation of the constant set value within a range in which the angular frequency is less than the predetermined value.

18. The control apparatus for an AC rotary machine as defined in claim 1, further comprising:

magnetic flux adjustment means for calculating a first axial component of the current command on a basis of the third voltage commands and the angular frequency so that, letting $\omega_{BASE}$ denote a maximum angular frequency at which a voltage saturation does not occur, and $V_{BASE}$ denote a maximum voltage amplitude which said voltage application means can output, (Angular frequency of the AC rotary machine)/$\omega_{BASE}$= (Amplitude of the third voltage commands)/$V_{BASE}$ is satisfied.

19. A method for measuring an electrical constant of an AC rotary machine executed by a control apparatus for the AC rotary machine, wherein the AC rotary machine is driven on a basis of current commands on rotating two-axis coordinates which rotate at an angular frequency of the AC rotary machine, said method comprising:

detecting, at the control apparatus, currents of the AC rotary machine;

transforming, at the control apparatus, the currents of the AC rotary machine into current detection values on the rotating two-axis coordinates;

calculating, at the control apparatus, first voltage commands on the rotating two-axis coordinates, from relational formulas among the current commands on the rotating two-axis coordinates, the angular frequency and a plurality of electrical constants of the AC rotary machine;

calculating, at the control apparatus, the second voltage commands on the rotating two-axis coordinates, on a basis of difference currents between the current commands on the rotating two-axis coordinates and the current detection values on the rotating two-axis coordinates, so that the difference currents converges into zero;

calculating, at the control apparatus, third voltage commands on the rotating two-axis coordinates, by adding the first voltage commands on the rotating two-axis coordinates and the second voltage commands on the rotating two-axis coordinates;

applying, at the control apparatus, voltages to the AC rotary machine on a basis of the third voltage commands on the rotating two-axis coordinates;

setting, at the control apparatus, at least one of the plurality of electrical constants with a constant set value inputted from outside; and calculating, at the control apparatus, the constant set value on a basis of the second voltage commands.

20. A control apparatus for an AC rotary machine, wherein the AC rotary machine is driven on a basis of current commands on rotating two-axis coordinates which rotate at an angular frequency of the AC rotary machine, the control apparatus comprising:

a current detection unit that detects currents of the AC rotary machine;

a coordinate transformation unit that transforms current detection values from said current detection unit, into current detection values on the rotating two-axis coordinates;

a first voltage command calculation unit that calculates first voltage commands on the rotating two-axis coordinates, from relational formulas among the current commands on the rotating two-axis coordinates, the angular frequency and a plurality of electrical constants of the AC rotary machine;

a second voltage command calculation unit that calculates second voltage commands on the rotating two-axis coordinates, on a basis of difference currents between the current commands on the rotating two-axis coordinates and the current detection values on the rotating two-axis coordinates, so that the difference currents may converge into zero;

a third voltage command calculation unit that calculates third voltage commands on the rotating two-axis coordinates, by adding the first voltage commands on the rotating two-axis coordinates and the second voltage commands on the rotating two-axis coordinates;

a voltage application unit that applies voltages to the AC rotary machine on a basis of the third voltage commands on the rotating two-axis coordinates, wherein said first voltage command calculation unit sets at least one of the plurality of electrical constants with a constant set value inputted from outside; and a constant measurement unit that calculates the constant set value on a basis of the second voltage commands from said second voltage command calculation unit.

* * * * *